(12) United States Patent
Hofberg et al.

(10) Patent No.: US 8,321,363 B2
(45) Date of Patent: *Nov. 27, 2012

(54) TECHNOLOGY EVALUATION AND SELECTION APPLICATION

(75) Inventors: Mark G. Hofberg, Charlotte, NC (US); Daniel Bohen, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 285 days.

This patent is subject to a terminal disclaimer.

(21) Appl. No.: 12/845,168

(22) Filed: Jul. 28, 2010

(65) Prior Publication Data

US 2012/0030158 A1 Feb. 2, 2012

(51) Int. Cl.
*G06F 17/00* (2006.01)
(52) U.S. Cl. .......................... 706/45; 705/348
(58) Field of Classification Search .................... 705/38, 705/1; 706/11, 52, 60, 12, 4, 45
See application file for complete search history.

(56) References Cited

U.S. PATENT DOCUMENTS

| | | | | |
|---|---|---|---|---|
| 5,751,915 | A * | 5/1998 | Werbos | 706/4 |
| 5,754,738 | A * | 5/1998 | Saucedo et al. | 706/11 |
| 6,631,362 | B1 * | 10/2003 | Ullman et al. | 706/60 |
| 6,850,891 | B1 * | 2/2005 | Forman | 705/7.11 |
| 7,249,080 | B1 * | 7/2007 | Hoffman et al. | 705/36 R |
| 7,257,566 | B2 * | 8/2007 | Danielson et al. | 706/52 |
| 7,542,952 | B2 | 6/2009 | Yang et al. | |
| 7,698,236 | B2 * | 4/2010 | Cox et al. | 706/12 |
| 7,996,347 | B2 * | 8/2011 | Hutson et al. | 706/45 |
| 2002/0059093 | A1 | 5/2002 | Barton et al. | |
| 2004/0059588 | A1 | 3/2004 | Burritt et al. | |
| 2004/0059589 | A1 | 3/2004 | Moore et al. | |
| 2004/0172357 | A1 * | 9/2004 | Padgette | 705/38 |
| 2005/0114281 | A1 | 5/2005 | Riggs et al. | |
| 2006/0136871 | A1 | 6/2006 | O'Connor et al. | |
| 2006/0293946 | A1 | 12/2006 | Eicher | |
| 2007/0033060 | A1 * | 2/2007 | Gopalan et al. | 705/1 |
| 2008/0288330 | A1 | 11/2008 | Hildebrand et al. | |
| 2009/0299804 | A1 | 12/2009 | Owens et al. | |
| 2009/0327132 | A1 | 12/2009 | Diev et al. | |
| 2010/0010846 | A1 | 1/2010 | Bonk et al. | |
| 2010/0042643 | A1 | 2/2010 | Pattabhi et al. | |
| 2011/0213635 | A1 * | 9/2011 | Hutson et al. | 705/7.25 |

FOREIGN PATENT DOCUMENTS

WO WO 2008/154346 A2 12/2008

* cited by examiner

*Primary Examiner* — Jeffrey Gaffin
*Assistant Examiner* — Dave Misir
(74) *Attorney, Agent, or Firm* — Michael A. Springs; Moore & Van Allen PLLC; James C. Edwards

(57) ABSTRACT

Embodiments of the invention relate to systems, methods, and computer program products for evaluating and selecting technology. Specifically, present embodiments provide for assessing the relative importance of various capabilities and constraints to determine weighting factors and applying the weighting factors to potential technology solutions rated in terms of the applicability of the capabilities and constraints. The result is a capability fit score and a constraint fit score for each potential technology solution, which can be combined to form an overall technology fit score for each potential technology solution. Thus, present embodiments assess capabilities and constraints of various potential technology solutions and balance the capabilities and constraints to result in a quantitatively measurement of which technology solution is the best fit for the project at hand.

27 Claims, 16 Drawing Sheets

TECHNOLOGY EVALUATION

CAPABILITY APPLICABILITY RATING: — 322
- 0 = REQUIREMENT NOT ADDRESSED — 324
- 1 = MINIMAL COVERAGE OF REQUIREMENT
- 3 = PARTIALLY ADDRESSES REQUIREMENT (WORKAROUNDS REQUIRED) — 326
- 9 = MAJORITY OF ADDRESSES REQUIREMENT — 328

CONSTRAINT APPLICABILITY RATING:
- 0 = CONSTRAINT IS NOT APPLICABLE — 330
- 1 = CONSTRAINT IS A NEGLIGIBLE FACTOR — 332
- 9 = CONSTRAINT IS A SIGNIFICANT FACTOR — 334

| HIGH LEVEL SYSTEM CAPABILITIES/CONSTRAINTS | CAPABILITY CONSTRAINT WEIGHTING 142/234 | CURRENTLY IN BUSINESS-LINE PRODUCTION 308 | | | CURRENTLY IN ENTERPRISE PRODUCTION 310 | | | SUPPLIER SOLUTIONS 312 | | | MERGED IN-HOUSE SOLUTION 314 |
|---|---|---|---|---|---|---|---|---|---|---|---|
| HIGH LEVEL CAPABILITY | | TECH. SOLUTION #1 | TECH. SOLUTION #2 | TECH. SOLUTION #3 | TECH. SOLUTION #4 | TECH. SOLUTION #5 | TECH. SOLUTION #6 | TECH. SOLUTION #7 | TECH. SOLUTION #8 | TECH. SOLUTION #9 | TECH. SOLUTION #10 |
| RISK ASSESSMENT 104 | | | | | | | | | | | |
| METRIC MANAGEMENT 106 | | | | | | | | | | | |
| PROCESS MAPPING 108 | | | | | | | | | | | |
| EVENT MANAGEMENT 110 | | | | | | | | | | | |
| POLICY GOVERNANCE AND MGMT 112 | | | | | | | | | | | |
| REGULATORY COMPLIANCE 114 | | | | | | | | | | | |
| REAL TIME PRODUCTION 116 | | | | | | | | | | | |
| TECHNOLOGY CHANGE MGMT 118 | | | | | | | | | | | |

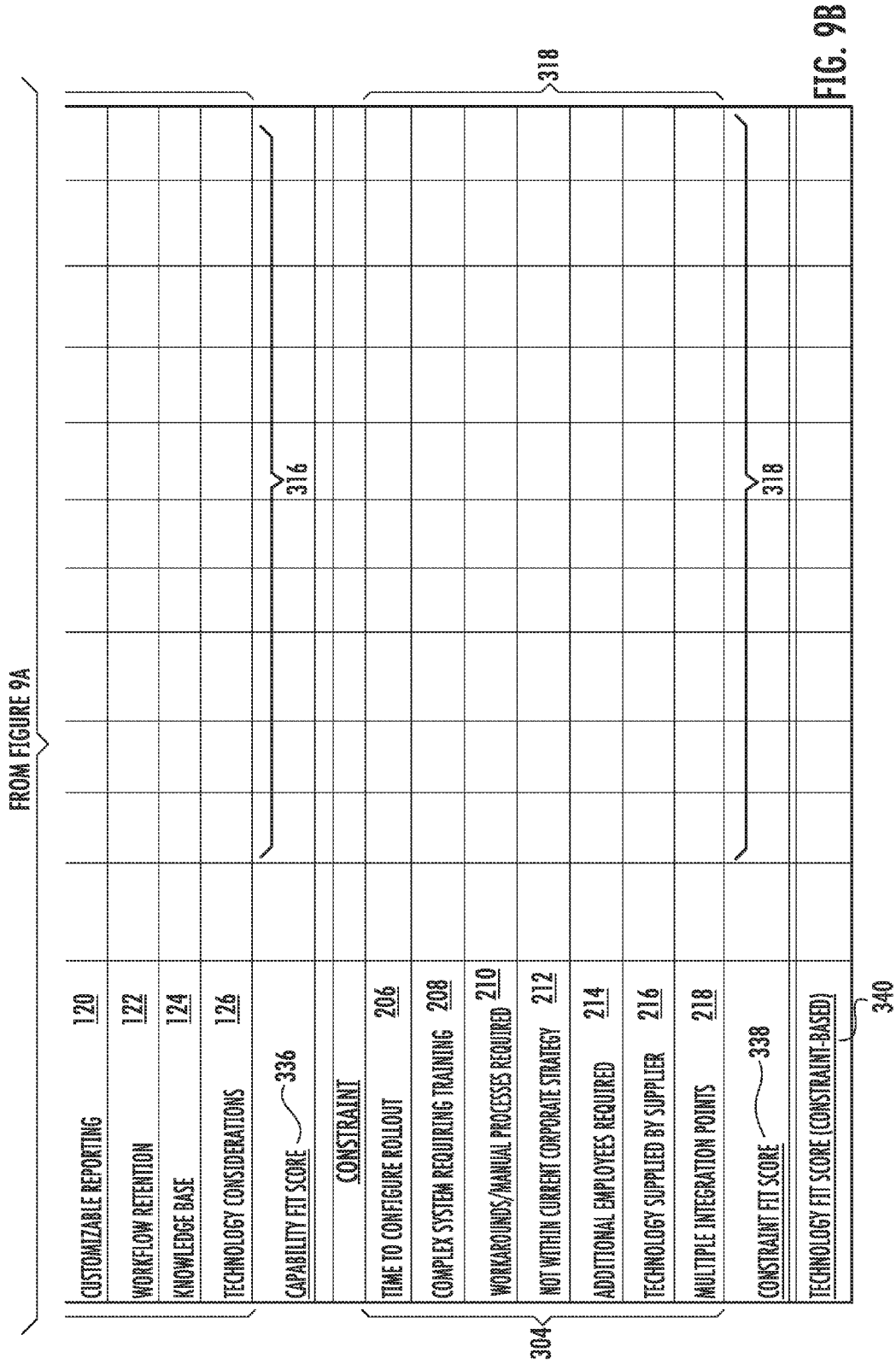

TECHNOLOGY EVALUATION

Capability Applicability Rating: 322
- 0 = Requirement not addressed
- 1 = Minimal coverage of requirement 326
- 3 = Partially addresses requirement (workarounds required) 328
- 9 = Majority of addresses requirement 330

Constraint Applicability Rating:
- 0 = Constraint is not applicable 332
- 1 = Constraint is a negligible factor
- 3 = Constraint is a significant factor 334

| HIGH LEVEL SYSTEM CAPABILITIES/CONSTRAINTS | | CAPABILITY CONSTRAINT WEIGHTING 142/234 | CURRENTLY IN BUSINESS-LINE PRODUCTION 308 | | | CURRENTLY IN ENTERPRISE PRODUCTION 310 | | | SUPPLIER SOLUTIONS 312 | | | MERGED IN-HOUSE SOLUTION 314 |
|---|---|---|---|---|---|---|---|---|---|---|---|---|
| | | | TECH. SOLUTION #1 | TECH. SOLUTION #2 | TECH. SOLUTION #3 | TECH. SOLUTION #4 | TECH. SOLUTION #5 | TECH. SOLUTION #6 | TECH. SOLUTION #7 | TECH. SOLUTION #8 | TECH. SOLUTION #9 | TECH. SOLUTION #10 |
| HIGH LEVEL CAPABILITY | | | | | | | | | | | | |
| RISK ASSESSMENT | 104 | 5% | 1 | 1 | 3 | 3 | 9 | 1 | 3 | 0 | 9 | 3 |
| METRIC MANAGEMENT | 106 | 11% | 0 | 0 | 0 | 0 | 9 | 9 | 9 | 0 | 9 | 9 |
| PROCESS MAPPING | 108 | 11% | 0 | 0 | 1 | 0 | 1 | 1 | 9 | 0 | 9 | 1 |
| EVENT MANAGEMENT | 110 | 9% | 9 | 9 | 1 | 3 | 9 | 9 | 9 | 0 | 9 | 9 |
| POLICY GOVERNANCE AND MGMT | 112 | 4% | 0 | 0 | 0 | 3 | 0 | 1 | 9 | 0 | 3 | 9 |
| REGULATORY COMPLIANCE | 114 | 16% | 0 | 0 | 0 | 0 | 1 | 0 | 0 | 0 | 3 | 3 |
| REAL TIME PRODUCTION | 116 | 5% | 0 | 0 | 0 | 0 | 0 | 9 | 9 | 0 | 1 | 9 |
| TECHNOLOGY CHANGE MGMT | 118 | 4% | 0 | 0 | 0 | 0 | 0 | 0 | 3 | 0 | 3 | 1 |

FROM FIGURE 10A

| | | | | | | | | | | |
|---|---|---|---|---|---|---|---|---|---|---|
| CUSTOMIZABLE REPORTING 120 | 15% | 3 | 3 | 3 | 3 | 3 | 9 | 9 | 9 | 9 |
| WORKFLOW RETENTION 122 | 9% | 1 | 1 | 0 | 9 | 1 | 9 | 3 | 9 | 3 |
| KNOWLEDGE BASE 124 | 3% | 3 | 1 | 3 | 3 | 0 | 9 | 3 | 9 | 3 |
| TECHNOLOGY CONSIDERATIONS 126 | 9% | 3 | 1 | 1 | 3 | 3 | 9 | 3 | 9 | 3 |
| CAPABILITY FIT SCORE 336 | | | | | | | | | | |
| CONSTRAINT | | | | | | | | | | |
| TIME TO CONFIGURE ROLLOUT 206 | 13% | 0 | 0 | 0 | 3 | 3 | 9 | 3 | 9 | 9 |
| COMPLEX SYSTEM REQUIRING TRAINING 208 | 7% | 0 | 0 | 0 | 9 | 3 | 9 | 3 | 9 | 9 |
| WORKAROUNDS/MANUAL PROCESSES REQUIRED 210 | 17% | 0 | 9 | 3 | 3 | 3 | 0 | 0 | 0 | 9 |
| NOT WITHIN CURRENT CORPORATE STRATEGY 212 | 6% | 0 | 3 | 3 | 3 | 3 | 0 | 3 | 3 | 3 |
| ADDITIONAL EMPLOYEES REQUIRED 214 | 15% | 0 | 0 | 3 | 3 | 0 | 3 | 0 | 3 | 9 |
| TECHNOLOGY SUPPLIED BY SUPPLIER 216 | 3% | 0 | 0 | 0 | 3 | 3 | 3 | 3 | 3 | 3 |
| MULTIPLE INTEGRATION POINTS 218 | 39% | 0 | 9 | 3 | 3 | 3 | 0 | 0 | 0 | 9 |
| CONSTRAINT FIT SCORE 338 | | | | | | | | | | |
| TECHNOLOGY FIT SCORE (CONSTRAINT-BASED) 340 | | | | | | | | | | |

FIG. 10B

TECHNOLOGY EVALUATION

Capability Applicability Rating:
- 0 = Requirement not addressed
- 1 = Minimal coverage of requirement
- 3 = Partially addresses requirement (workarounds required)
- 9 = Majority of addresses requirement Constraint Applicability Rating:
- 0 = Constraint is not applicable
- 1 = Constraint is a negligible factor
- 3 = Constraint is a significant factor

| HIGH LEVEL SYSTEM CAPABILITIES/CONSTRAINTS | CAPABILITY CONSTRAINT WEIGHTING | CURRENTLY IN BUSINESS-LINE PRODUCTION ||| CURRENTLY IN ENTERPRISE PRODUCTION ||| SUPPLIER SOLUTIONS ||| MERGED IN-HOUSE SOLUTION |
|---|---|---|---|---|---|---|---|---|---|---|---|
| | | TECH. SOLUTION #1 | TECH. SOLUTION #2 | TECH. SOLUTION #3 | TECH. SOLUTION #4 | TECH. SOLUTION #5 | TECH. SOLUTION #6 | TECH. SOLUTION #7 | TECH. SOLUTION #8 | TECH. SOLUTION #9 | TECH. SOLUTION #10 |
| HIGH LEVEL CAPABILITY | | | | | | | | | | | |
| RISK ASSESSMENT 104 | 5% | 1 | 1 | 3 | 3 | 9 | 1 | 3 | 0 | 9 | 3 |
| METRIC MANAGEMENT 106 | 11% | 0 | 0 | 0 | 0 | 9 | 9 | 9 | 0 | 9 | 9 |
| PROCESS MAPPING 108 | 11% | 0 | 0 | 1 | 0 | 1 | 1 | 9 | 0 | 9 | 1 |
| EVENT MANAGEMENT 110 | 9% | 0 | 9 | 1 | 3 | 9 | 9 | 9 | 0 | 9 | 9 |
| POLICY GOVERNANCE AND MGMT 112 | 4% | 9 | 0 | 0 | 3 | 0 | 1 | 9 | 0 | 9 | 9 |
| REGULATORY COMPLIANCE 114 | 16% | 0 | 0 | 0 | 0 | 1 | 0 | 9 | 0 | 3 | 3 |
| REAL TIME PRODUCTION 116 | 5% | 0 | 0 | 0 | 0 | 0 | 9 | 3 | 0 | 1 | 9 |
| TECHNOLOGY CHANGE MGMT 118 | 4% | 0 | 0 | 0 | 0 | 0 | 0 | 9 | 0 | 3 | 1 |

FROM FIGURE 11A

| | | | | | | | | | | | |
|---|---|---|---|---|---|---|---|---|---|---|---|
| CUSTOMIZABLE REPORTING 120 | 15% | 3 | 3 | 0 | 3 | 3 | 3 | 9 | 9 | 9 | 9 |
| WORKFLOW RETENTION 122 | 9% | 1 | 1 | 0 | 9 | 0 | 3 | 9 | 3 | 9 | 3 |
| KNOWLEDGE BASE 124 | 3% | 3 | 1 | 3 | 3 | 3 | 1 | 9 | 3 | 9 | 3 |
| TECHNOLOGY CONSIDERATIONS 126 | 9% | 3 | 1 | 1 | 3 | 3 | 3 | 9 | 3 | 9 | 3 |
| CAPABILITY FIT SCORE 336 | | 14% | 17% | 6% | 24% | 27% | 25% | 83% | 22% | 69% | 49% |
| CONSTRAINT | | | | | | | | | | | |
| TIME TO CONFIGURE ROLLOUT | 13% | 0 | 0 | 0 | 3 | 3 | 3 | 9 | 3 | 9 | 9 |
| COMPLEX SYSTEM REQUIRING TRAINING | 7% | 0 | 0 | 0 | 3 | 9 | 3 | 9 | 3 | 9 | 9 |
| WORKAROUNDS/MANUAL PROCESSES REQUIRED | 17% | 0 | 9 | 3 | 9 | 3 | 3 | 0 | 0 | 0 | 9 |
| NOT WITHIN CURRENT CORPORATE STRATEGY | 6% | 0 | 3 | 3 | 0 | 3 | 3 | 0 | 0 | 3 | 3 |
| ADDITIONAL EMPLOYEES REQUIRED | 15% | 0 | 3 | 0 | 0 | 3 | 3 | 3 | 3 | 3 | 9 |
| TECHNOLOGY SUPPLIED BY SUPPLIER | 3% | 0 | 0 | 3 | 0 | 3 | 0 | 3 | 0 | 3 | 3 |
| MULTIPLE INTEGRATION POINTS | 39% | 0 | 9 | 3 | 9 | 3 | 3 | 0 | 3 | 0 | 9 |
| CONSTRAINT FIT SCORE 338 | | 0% | 63% | 26% | 62% | 38% | 32% | 26% | 10% | 28% | 94% |
| TECHNOLOGY FIT SCORE (CONSTRAINT-BASED) | | 14% | 14% | 5% | 20% | 24% | 23% | 77% | 22% | 64% | 37% |

FIG. 11B

TECHNOLOGY EVALUATION AND SELECTION APPLICATION

FIELD

In general, embodiments of the invention relate to methods, systems, apparatus and computer program products for evaluating potential technology solutions and, more particularly, determining the capabilities and constraints associated with potential technology solutions and determining an overall technology fit score for each potential technology solution based on the capabilities and constraints.

BACKGROUND

The selection of a technology solution from amongst various different potential technology solutions is typically accomplished by interviewing associates or other stakeholders associated with a project to assess the project's requirements. Once the requirements of the project are known, technology solutions are identified that meet the project's requirements. Typically, the technology solution that comes closest to meeting all of the project's requirements is the solution that is chosen for the project.

However, such a means for selecting a technology solution fails to assess the importance of technology capabilities and technology constraints as they apply to each of the potential technology solutions and the project at hand. While technology capabilities favorable affect the project, technological constraints adversely affect the project, therefore the desire is to maximize capabilities while minimizing constraints. If selection of technology solutions is limited to project requirements, without consideration of capabilities and constraints associated with the solutions, the resulting technology solution that is selected may not be the best technological fit for the project.

Therefore, a need exists to develop a system for technology evaluation and selection that takes into account project's importance of technology capabilities and technology constraints. The desired system should balance the technology capabilities with the technology constraints to provide for technology evaluation. In addition, the desired system should provide for a qualitative result that measures the overall technology fit for various potential technology solutions in terms of their respective capabilities and constraints and the importance the capabilities and constraints for a particular project.

SUMMARY

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention relate to systems, apparatus, methods, and computer program products for a technology evaluation and selection. Embodiments herein disclose determine the importance of specific capabilities and constraints and assign a relative weight to each capability and constraint in relation to their importance. Capability and constraint fit analysis is performed based on rating the applicability of each capability and constraint to various potential technology solutions; resulting in a capability fit score and a constraint fit score for each of the potential technology solutions. The capability fit score and the constraint fit score for a given potential technology solution can be properly weighted to result in an overall technology fit score for each of the potential technology solutions. The overall technology fit score takes into account the project's relative importance of specific capabilities and constraints and provides a quantitative means of distinguishing between potential technology solutions.

An apparatus for technology evaluation defines first embodiments of the invention. The apparatus includes a computing device including a memory and at least one processor. The apparatus additionally includes a technology evaluation application stored in the memory, executable by the processor and configured to provide technology evaluations for specified projects requiring technology. The technology evaluation application includes a capability weighting routine that is configured to receive a capability importance indicator for each of a plurality of predefined capabilities in comparison to each of the other capabilities and determine a capability weighting for each of the capabilities based on the capability importance indicators. The application additionally includes a constraint weighting routine configured to receive a constraint importance indicator for each of the plurality of predefined constraints in comparison to each of the other constraints and determine a constraint weighting for each of the constraints based on the constraint importance indicators.

The technology evaluation application also includes a capability fit score routine configured to receive a capability applicability rating for each of a plurality of potential technology solutions in relation to each of the predetermined capabilities and determine a capability fit score for each of the potential technology solutions based on associated capability applicability ratings and associated capability weightings. In addition, the application includes a constraint fit score routine configured to receive a constraint applicability rating for each of the plurality of potential technology solutions in relation to each of the predetermined constraints and determine a constraint fit score for each of the potential technology solutions based on associated constraint applicability ratings and associated constraint weightings.

The technology evaluation application additionally includes a technology fit score routine configured to determine a technology fit score for each of the potential technology solutions based on an associated capability fit score and an associated constraint fit score.

In specific embodiments of the apparatus, the technology evaluation application further includes a technology evaluation spreadsheet mechanism configured to include the capability fit score routine, the constraint fit score routine and the technology fit score routine. In other related embodiments of the apparatus, the technology evaluation application further includes a capability importance spreadsheet mechanism configured to include the capability weighting routine and a constraint importance spreadsheet mechanism configured to include the constraint weighting routine.

In other specific embodiments of the apparatus, the capability weighting routine is further configured to implement Analytical Hierarchy Process (AHP) to determine the capability weightings. In still further related embodiments of the apparatus, the constraint weighting routine is further configured to implement Analytical Hierarchy Process (AHP) to determine the constraint weightings.

In yet other specific embodiments of the apparatus, the capability weighting routine is further configured to receive the capability importance indicator, wherein the capability importance indicator is one of (1) much more important, (2)

more important, (3) equally important, (4) less important or (5) much less important. While in other related embodiments of the apparatus, the constraint weighting routine is further configured to receive the constraint importance indicator, wherein the constraint importance indicator is one of (1) much more constraining, (2) more constraining, (3) equally constraining, (4) less constraining or (5) much less constraining.

In still further specific embodiments of the apparatus, the capability fit score routine is further configured to determine the plurality capability fit scores by multiplying, for each capability, the capability weighting by the capability applicability rating to result in a product, summing the products and dividing the sum by a highest valued capability applicability rating to result in the capability fit score. In other related specific embodiments, the constraint fit score routine is further configured to determine the plurality constraint fit scores by multiplying, for each constraint, the constraint weighting by the constraint applicability rating to result in a product, summing the products and dividing the sum by a highest valued constraint applicability rating to result in the constraint fit score.

Moreover, in other specific embodiments of the apparatus, the technology fit score routine is further configured to determine a technology constraint fit scores by subtracting the product of the capability fit score, the constraint fit score and a first weighting factor from the capability fit score or a technology capability fit score by subtracting the product of the capability fit score, the constraint fit score and a second weighting factor from the constraint fit score. The first weighting factor and the second weighting factor are defined as having a sum equal to one.

A method for technology evaluation defines second embodiments of the invention. The method includes receiving a capability importance indicator for each of a plurality of predefined capabilities in comparison to each of the other capabilities and a constraint importance indicator for each of a plurality of predefined constraints in comparison to each of the other constraints. Additionally, the method includes determining a capability weighting for each of the capabilities based on the capability importance indicators and a constraint weighting for each of the constraints based on the constraint importance indicators.

In addition, the method includes receiving a capability applicability rating for each of a plurality of potential technology solutions in relation to each of the predetermined capabilities and a constraint applicability rating for each of the plurality of potential technology solutions in relation to each of the predetermined constraints. The method also includes determining a capability fit score for each of the potential technology solutions based on associated capability applicability ratings and associated capability weightings and a constraint fit score for each of the potential technology solutions based on associated constraint applicability ratings and associated capability weightings. Moreover, the method includes determining a technology fit score for each of the potential technology solutions based on an associated capability fit score and an associated constraint fit score.

In specific embodiments of the method, determining the capability weighting further comprises determining, via the computing device processor, the capability weighting by implementing Analytical Hierarchy Process (AHP). In other related specific embodiments of the method, determining the constraint weighting further comprises determining, via the computing device processor, the constraint weighting by implementing Analytical Hierarchy Process (AHP).

In still further specific embodiments of the method, receiving the capability importance indicator further includes receiving the capability importance indicator, wherein the capability importance indicator is one of (1) much more important, (2) more important, (3) equally important, (4) less important and (5) much less important. In similar related embodiments of the method, receiving the constraint importance indicator further comprises receiving the constraint importance indicator, wherein the constraint importance indicator is one of (1) much more constraining, (2) more constraining, (3) equally constraining, (4) less constraining and (5) much less constraining.

In additional specific embodiments of the method, determining the capability fit score further includes multiplying, for each capability, the capability weighting by the capability applicability rating to result in a product, summing the products and dividing the sum by a highest valued capability applicability rating to result in the capability fit score. In similar related specific embodiments of the method, determining the constraint fit score further includes multiplying, for each constraint, the constraint weighting by the constraint applicability rating to result in a product, summing the products and dividing the sum by the highest valued constraint applicability rating to result in the constraint fit score.

Moreover, in other specific embodiments of the method, determining the technology fit score further comprises determining a technology constraint fit score by subtracting the product of the capability fit score, the constraint fit score and a first weighting factor from the capability fit score or determining a technology capability fit score by subtracting the product of the capability fit score, the constraint fit score and a second weighting factor from the constraint fit score. The first weighting factor and the second weighting being summed to equal one.

A computer program product that includes a non-transitory computer-readable medium defines third embodiments of the invention. The computer-readable medium includes a first set of codes for causing a computer to receive a capability importance indicator for each of a plurality of predefined capabilities in comparison to each of the other capabilities and a constraint importance indicator for each of a plurality of predefined constraints in comparison to each of the other constraints. Additionally, the computer-readable medium includes a second set of codes for causing a computer to determine a capability weighting for each of the capabilities based on the capability importance indicators and a constraint weighting for each of the constraints based on the constraint importance indicators.

The computer-readable medium also includes a third set of codes for causing a computer to receive a capability applicability rating for each of a plurality of potential technology solutions in relation to each of the predetermined capabilities and a constraint applicability rating for each of the plurality of potential technology solutions in relation to each of the predetermined constraints. In addition, the computer-readable medium includes a fourth set of codes for causing a computer to determine a capability fit score for each of the potential technology solutions based on associated capability applicability ratings and associated capability weightings and a constraint fit score for each of the potential technology solutions based on associated constraint applicability ratings and associated capability weightings. Moreover, the computer-readable medium includes a fifth set of codes for causing a computer to determine a technology fit score for each of the potential technology solutions based on an associated capability fit score and an associated constraint fit score.

Thus, further details are provided below for systems, apparatus, methods and computer program products for evaluating and selecting technology. Specifically, present embodiments provide for assessing the relative importance of various capabilities and constraints to determine weighting factors and applying the weighting factors to potential technology solutions rated in terms of the applicability of the capabilities and constraints. The result is a capability fit score and a constraint fit score for each potential technology solution, which can be combined to form an overall technology fit score for each potential technology solution. Thus, present embodiments assess capabilities and constraints of various potential technology solutions and balance the capabilities and constraints to result in a quantitatively measurement of which technology solution is the best fit for the project at hand.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
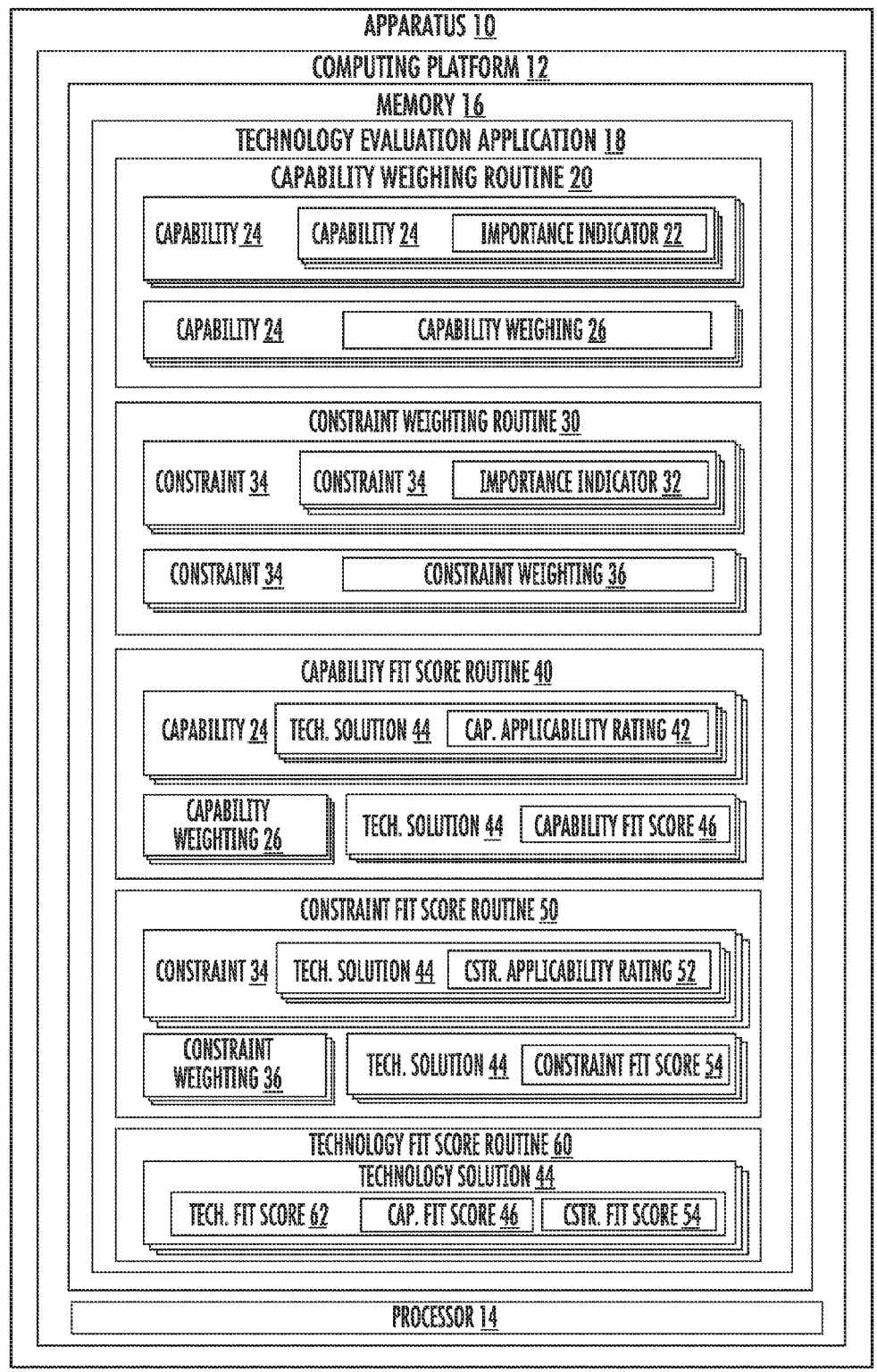
Figure 2:
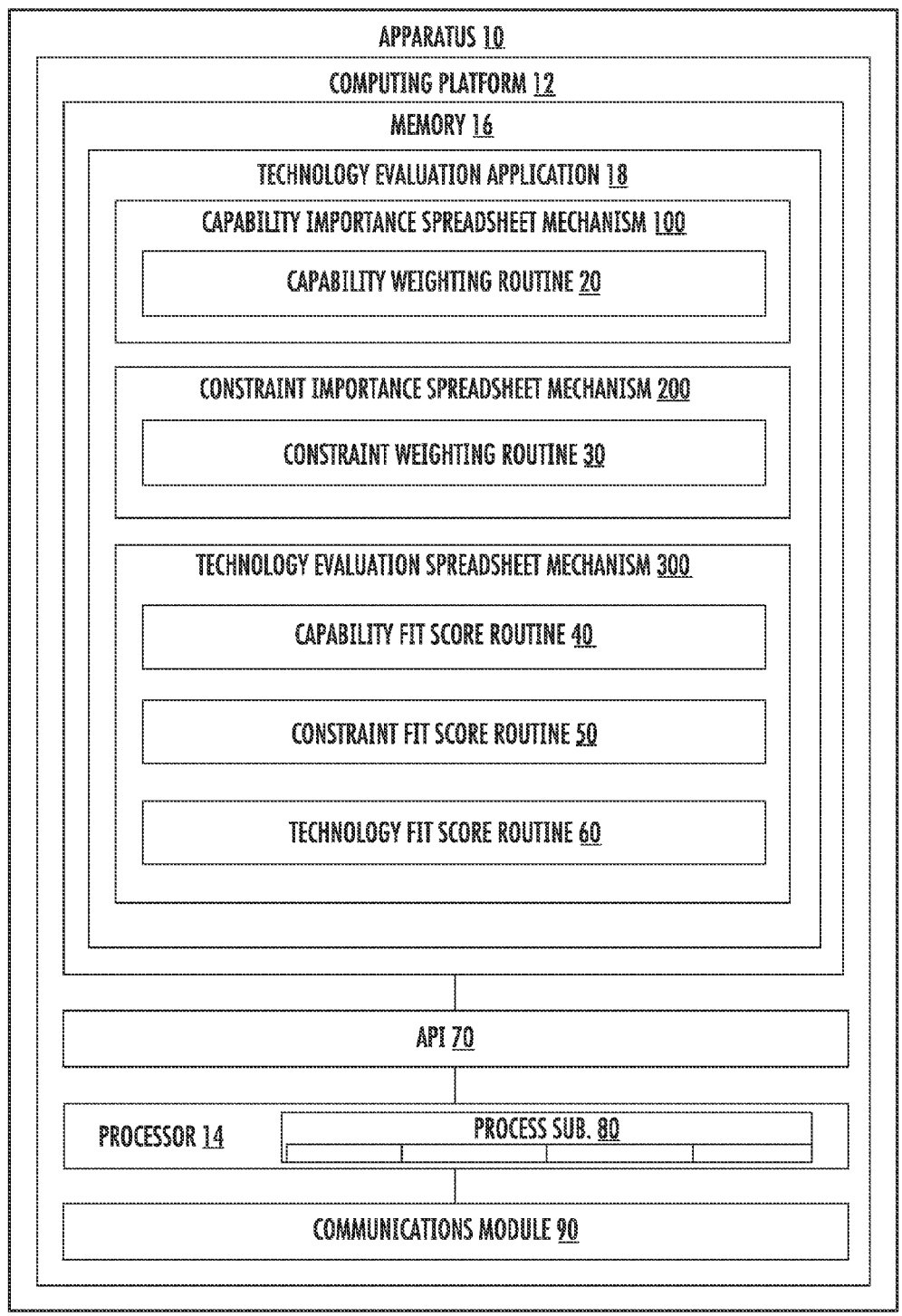
Figure 3:
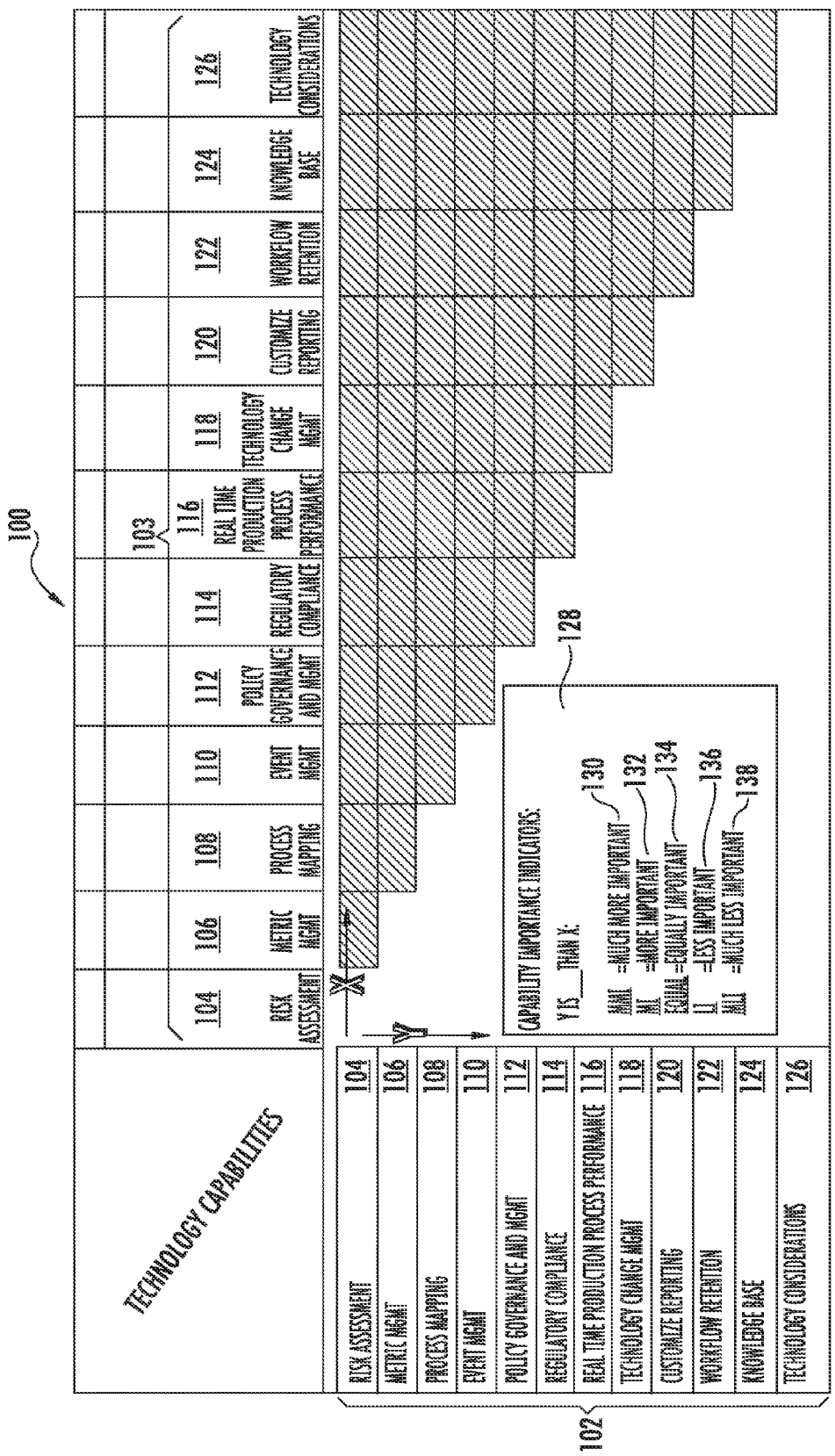
Figure 4:
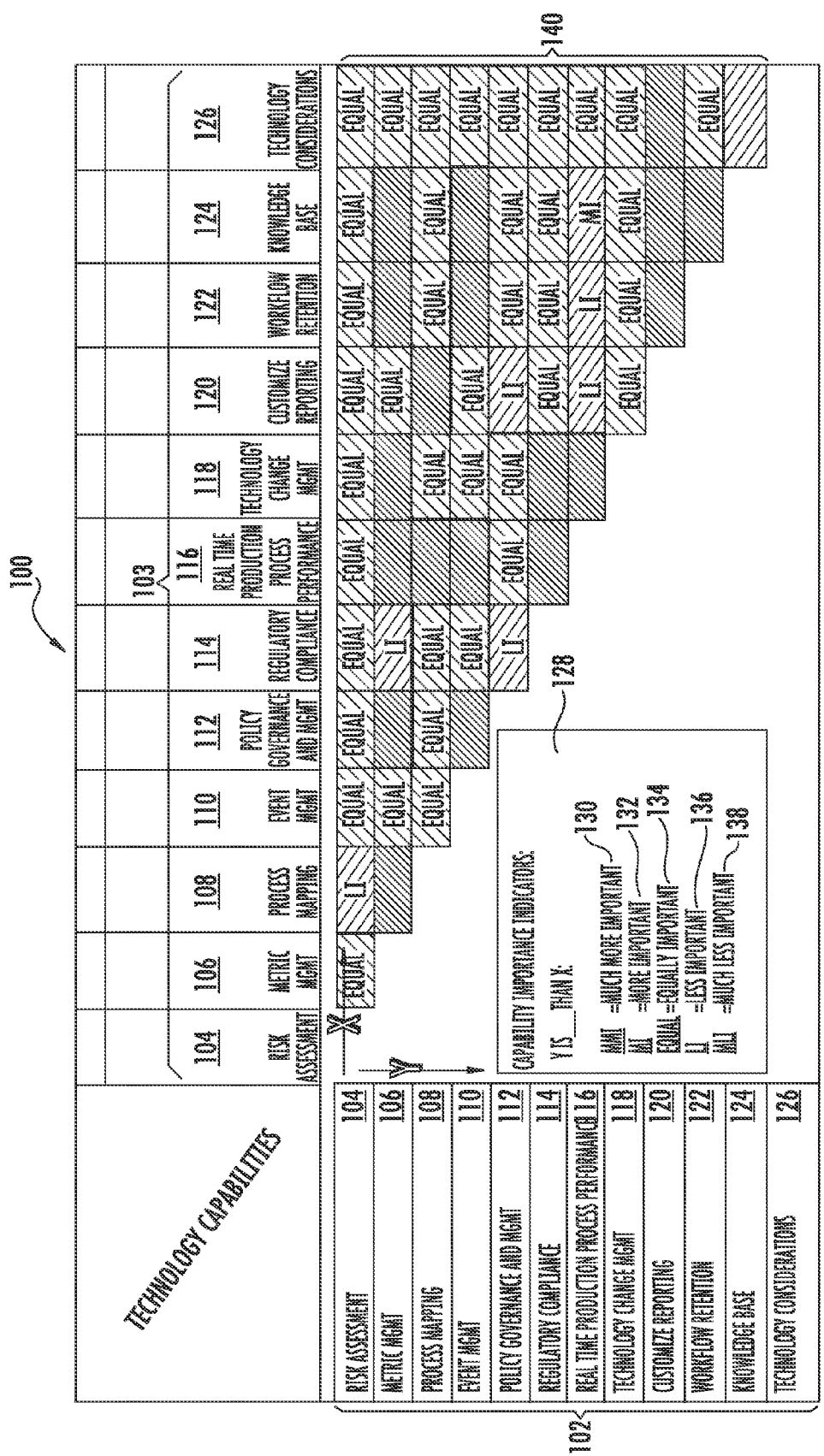
Figure 5:
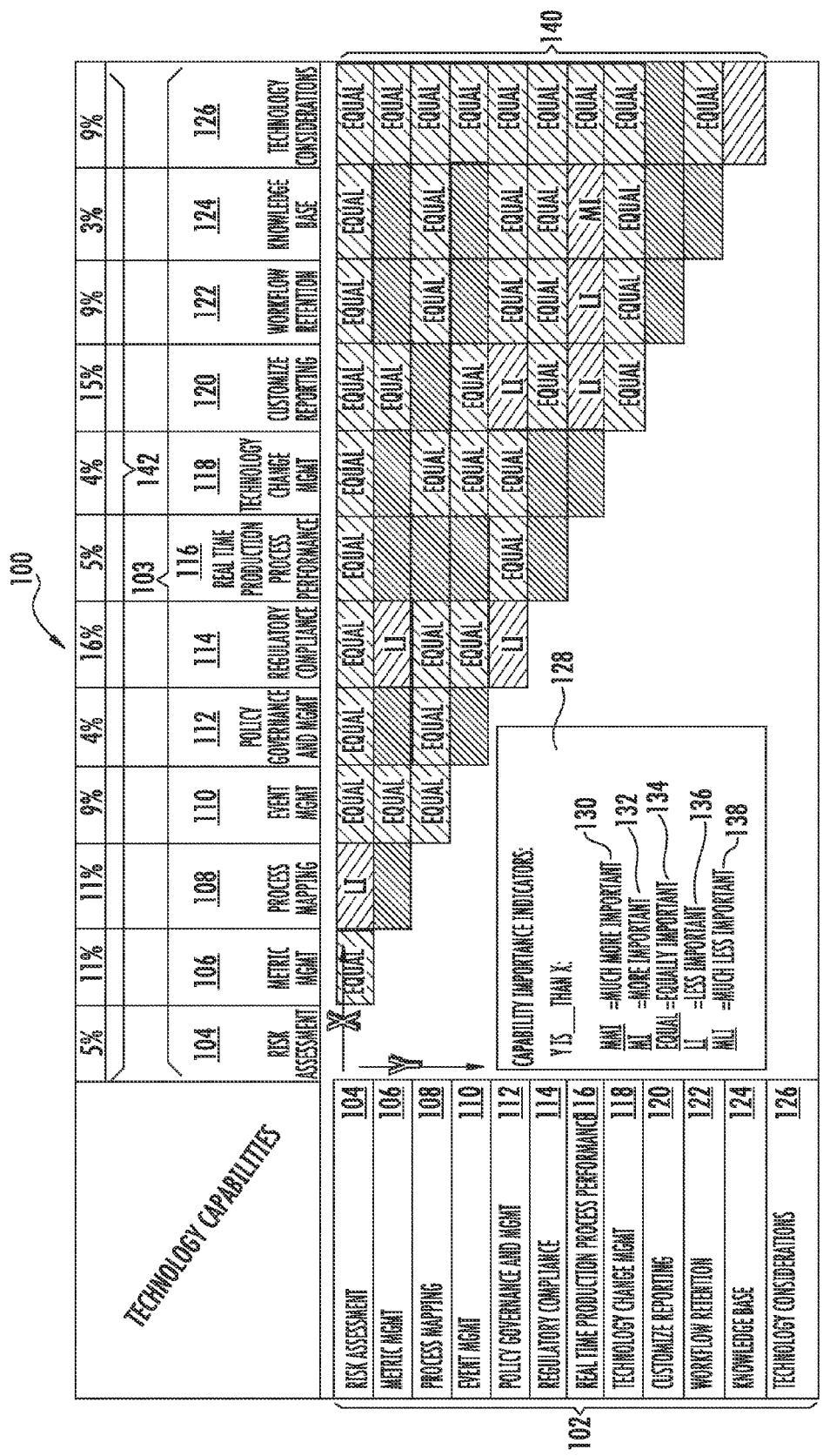
Figure 6:
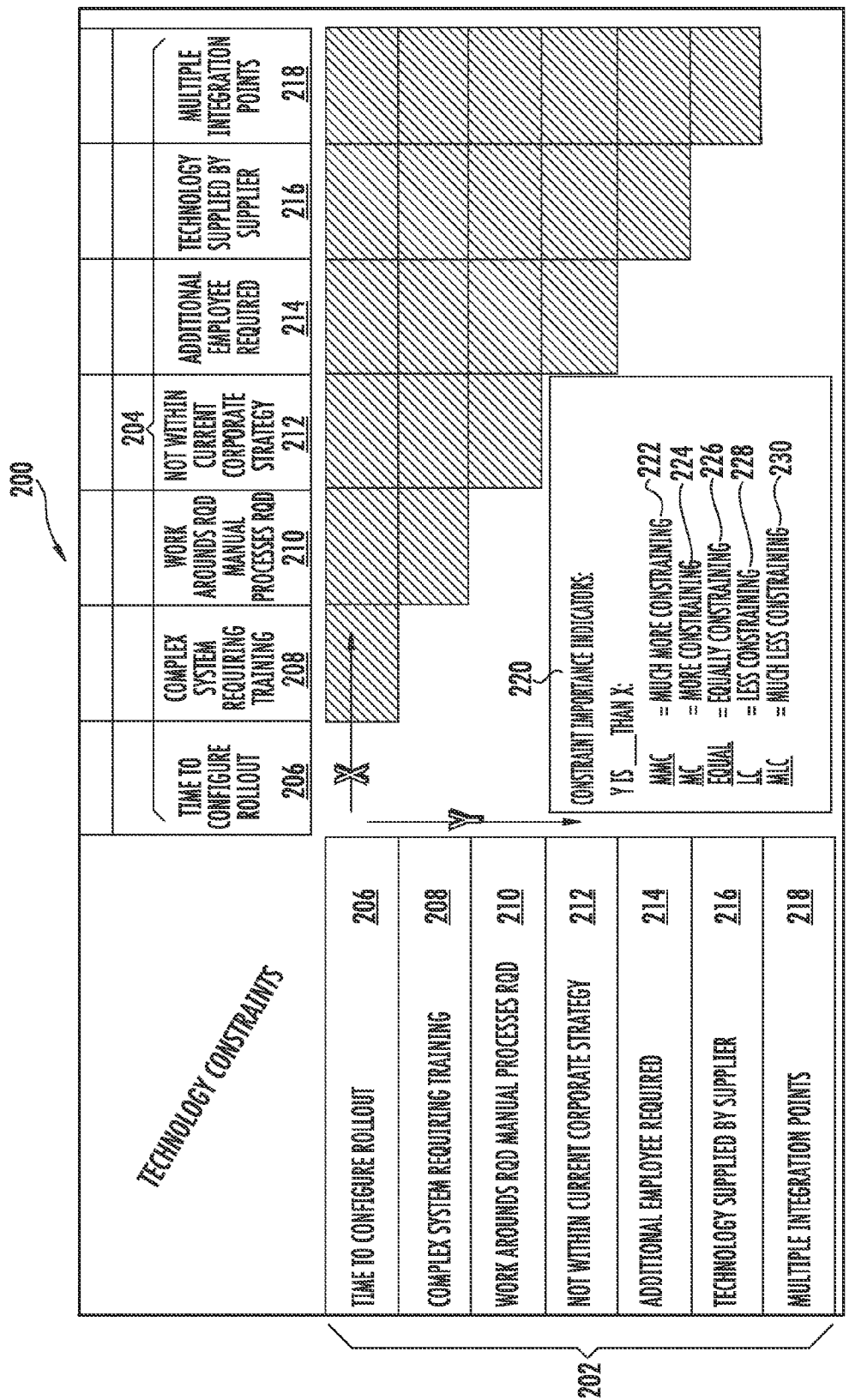
Figure 7:
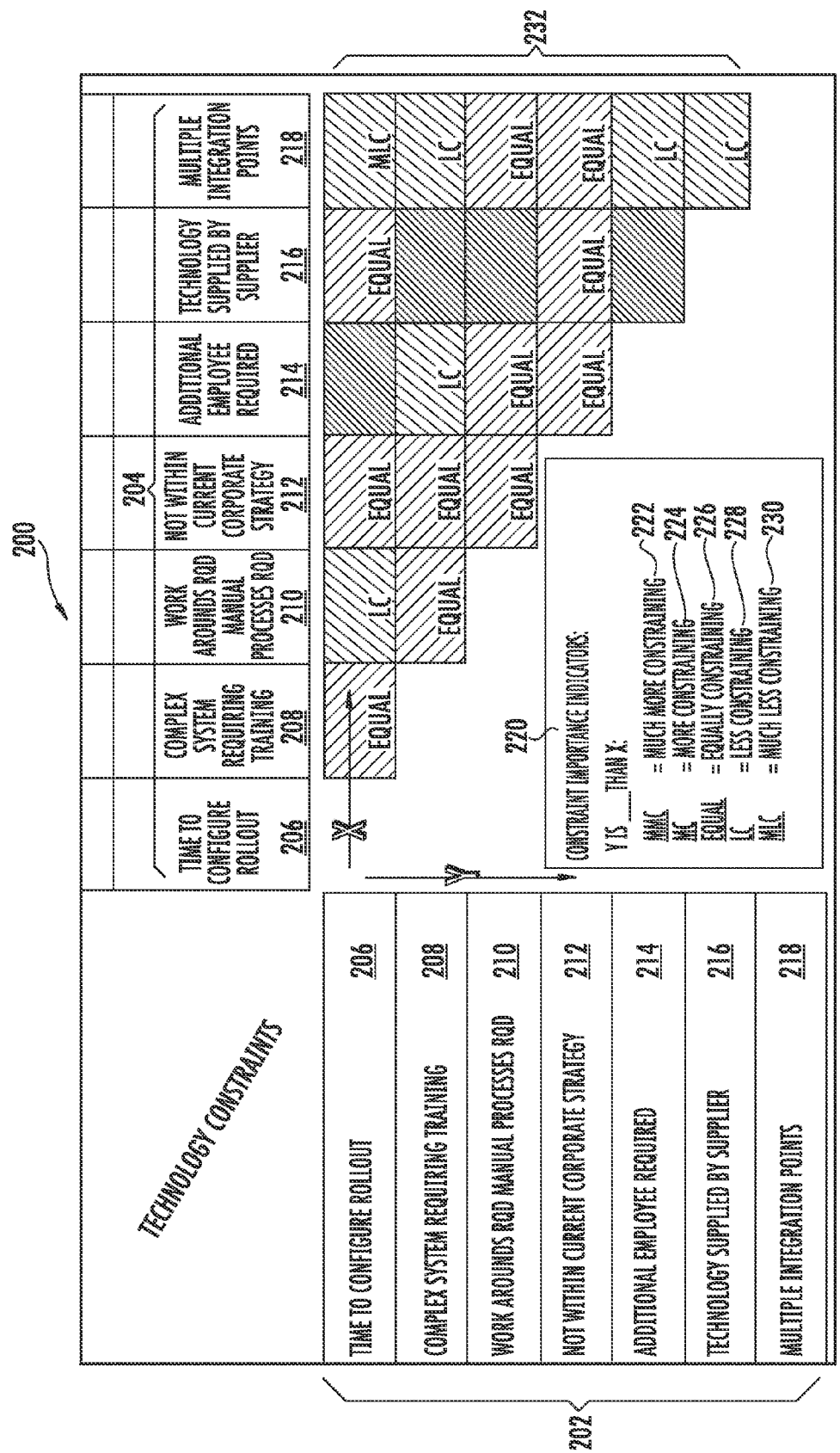
Figure 8:
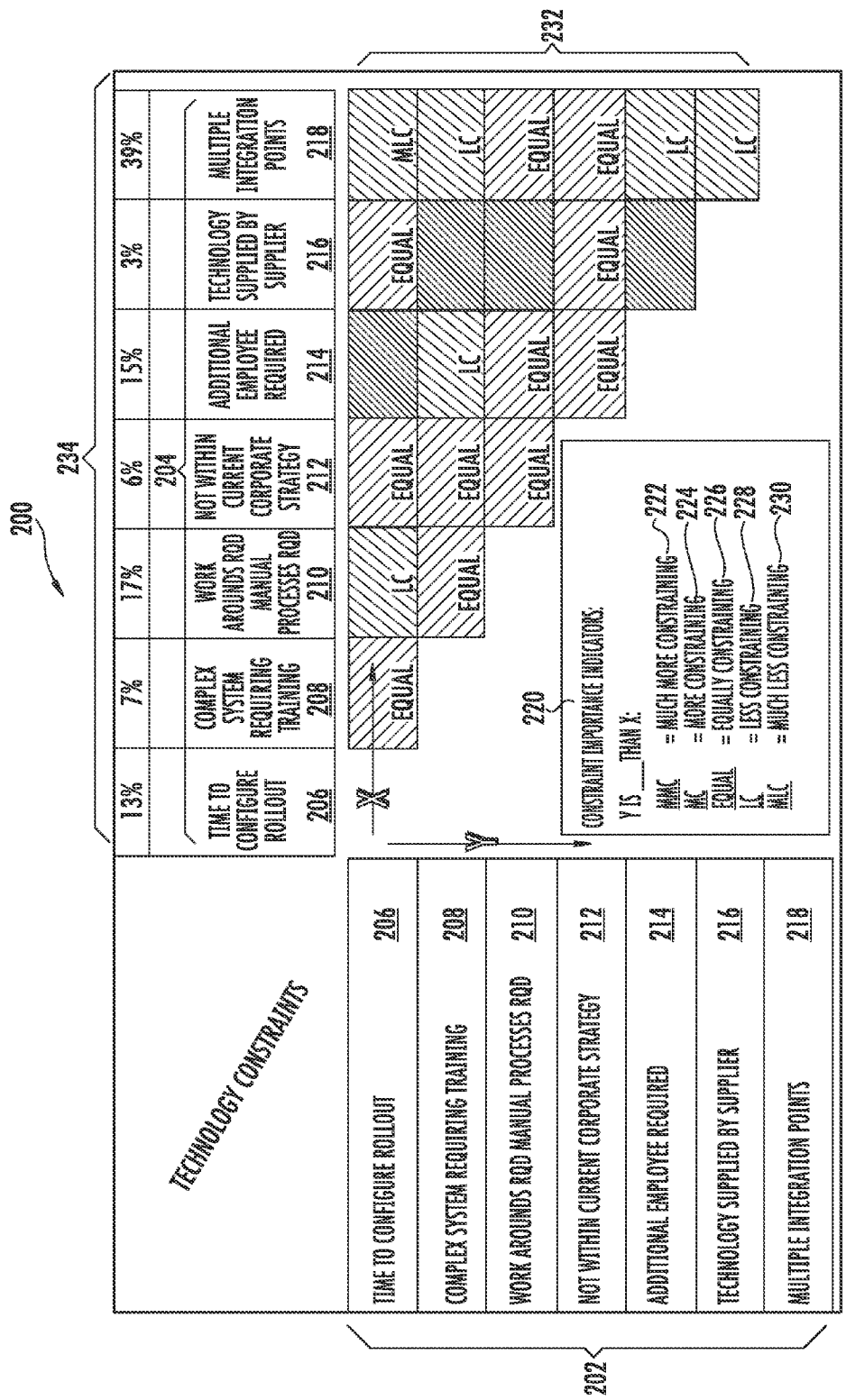
Figure 12:
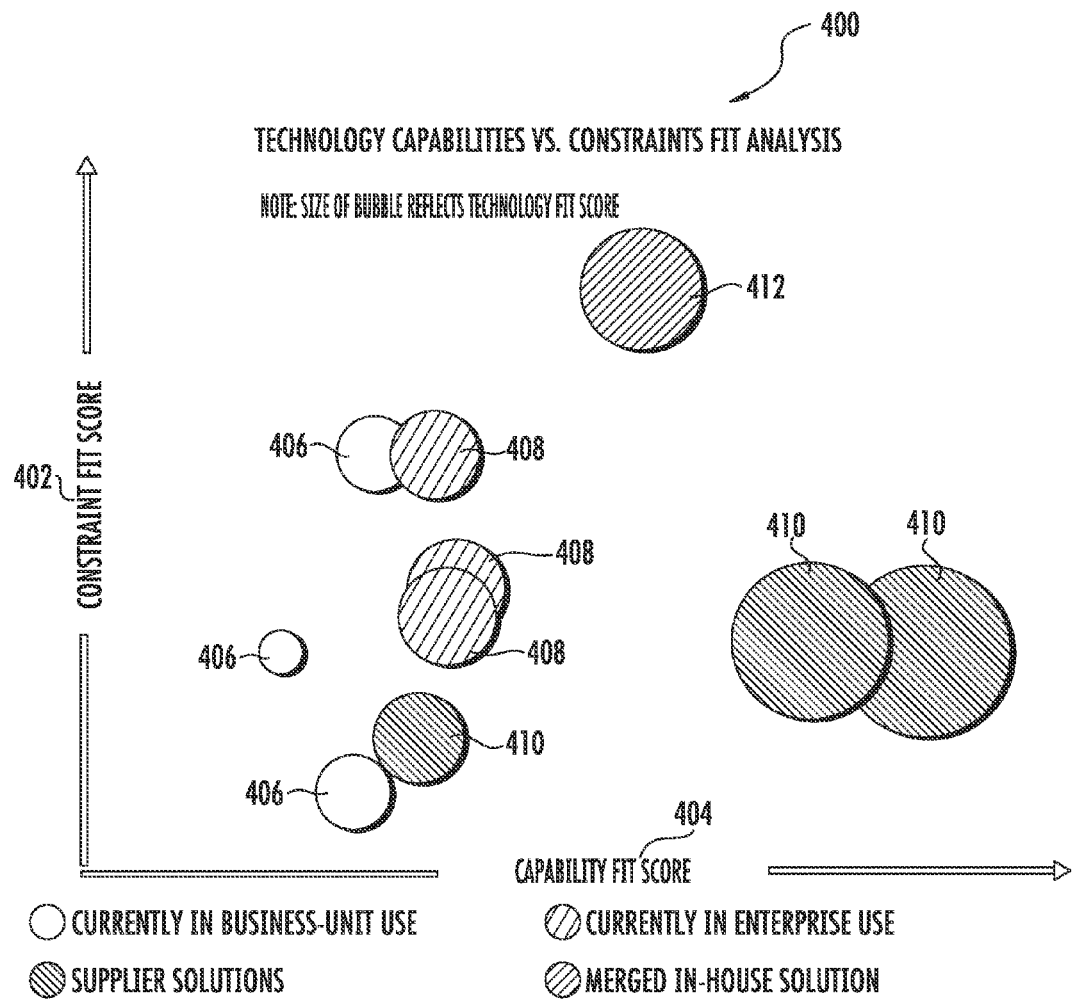
Figure 13:
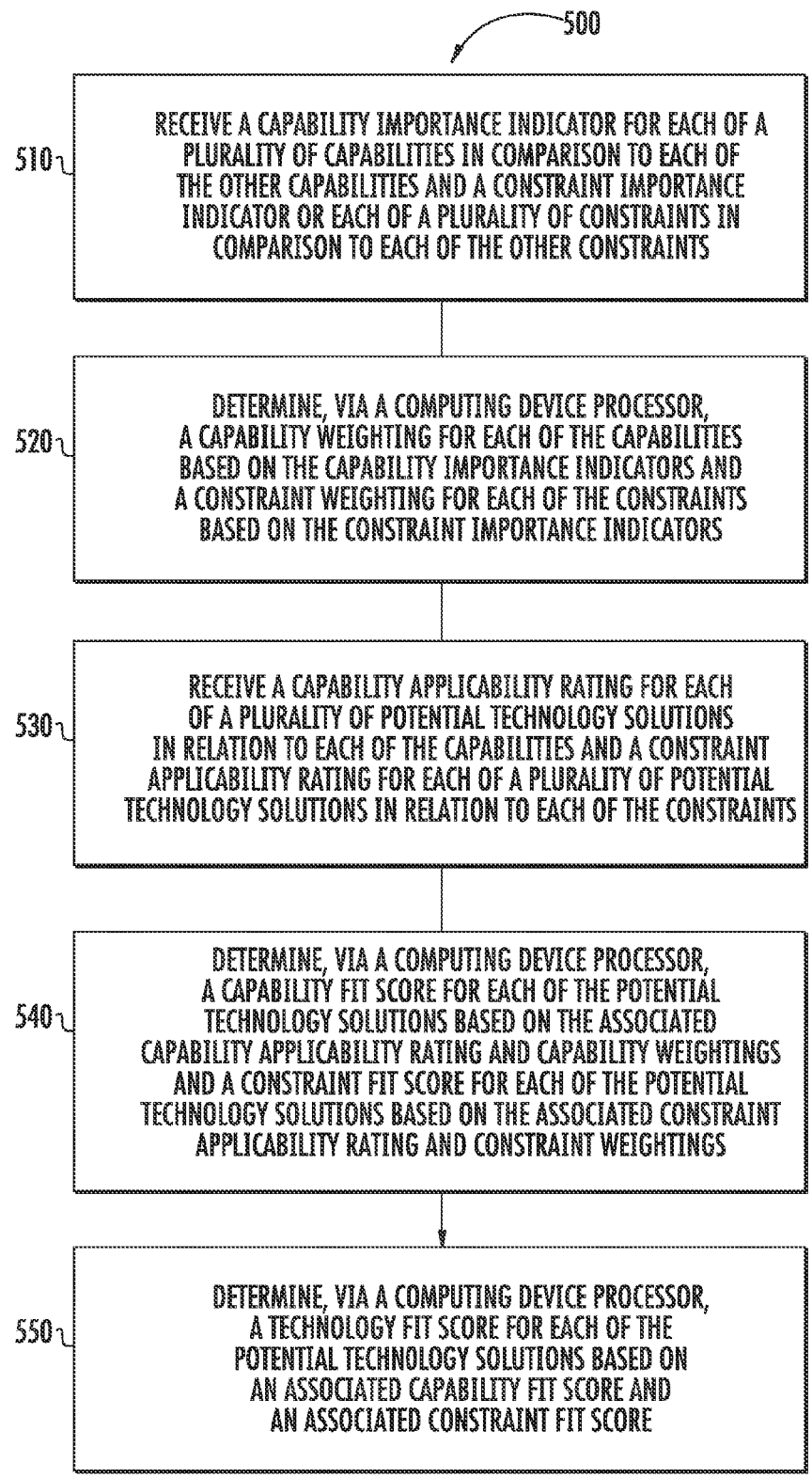

Having thus described embodiments of the invention in general terms, reference will now be made to the accompanying drawings, which are not necessarily drawn to scale, and wherein:

FIG. 1 is schematic diagram of an apparatus configured to provide technology evaluation, in accordance with embodiments of the present invention;

FIG. 2 is a schematic diagram of a more detailed apparatus configured to provide technology evaluation, in accordance with embodiments of the present invention;

FIG. 3 is a schematic diagram of a capability weighting spreadsheet mechanism prior to data entry, in accordance with embodiments of the present invention;

FIG. 4 is a schematic diagram of a capability weighting spreadsheet mechanism after entry of the capability importance indicators, in accordance with embodiments of the present invention;

FIG. 5 is a schematic diagram of a capability weighting spreadsheet mechanism after determination of the capability weighting, in accordance with embodiments of the present invention;

FIG. 6 is a schematic diagram of a constraint weighting spreadsheet mechanism prior to data entry, in accordance with embodiments of the present invention;

FIG. 7 is a schematic diagram of a constraint weighting spreadsheet mechanism after entry of the constraint importance indicators, in accordance with embodiments of the present invention;

FIG. 8 is a schematic diagram of a constraint weighting spreadsheet mechanism after determination of the constraint weighting, in accordance with embodiments of the present invention;

FIGS. 9A and 9B are a schematic diagram of the technology evaluation spreadsheet mechanism prior to data entry, in accordance with embodiments of the present invention;

FIGS. 10A and 10B are a schematic diagram of the technology evaluation spreadsheet mechanism after entry of the capability and constraint importance ratings, in accordance with embodiments of the invention;

FIGS. 11A and 11B are a schematic diagram of the technology evaluation spreadsheet mechanism after determination of the capability fit score, constraint fit score and technology fit score, in accordance with embodiments of the invention;

FIG. 12 is bubble diagram highlighting the results of a technology evaluation conduced in accordance with embodiments of the present invention; and FIG. 13 is a flow diagram of a method for technology evaluation, in accordance with embodiments of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

As may be appreciated by one of skill in the art, the present invention may be embodied as a method, system, computer program product, or a combination of the foregoing. Accordingly, the present invention may take the form of an entirely software embodiment (including firmware, resident software, micro-code, etc.) or an embodiment combining software and hardware aspects that may generally be referred to herein as a "system." Furthermore, embodiments of the present invention may take the form of a computer program product on a computer-readable medium having computer-usable program code embodied in the medium.

Any suitable computer-readable medium may be utilized. The computer-readable medium may be, for example but not limited to, an electronic, magnetic, optical, electromagnetic, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device; or transmission media such as those supporting the Internet or an intranet. Note that the computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of embodiments of the present invention may be written in an object oriented, scripted or unscripted programming language such as JAVA, Perl, Smalltalk, C++, or the like. However, the computer program code for carrying out operations of embodiments of the present invention may also be written in conventional procedural programming languages, such as the "C" programming language or similar programming languages.

Embodiments of the present invention are described below with reference to flowchart illustrations and/or block diagrams of methods, apparatus (systems), and computer program products. It may be understood that each block of the flowchart illustrations and/or block diagrams, and/or combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block(s).

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

Embodiments of the present invention relate to systems, apparatus, methods, and computer program products for a technology evaluation and selection. Embodiments herein disclose determine the importance of specific capabilities and constraints and assign a relative weight to each capability and constraint in relation to their importance. Capability and constraint fit analysis is performed based on rating the applicability of each capability and constraint to various potential technology solutions; resulting in a capability fit score and a constraint fit score for each of the potential technology solutions. The capability fit score and the constraint fit score for a given potential technology solution can be properly weighted to result in an overall technology fit score for each of the potential technology solutions. The overall technology fit score takes into account the project's relative importance of specific capabilities and constraints and provides a quantitative means of distinguishing between potential technology solutions.

Thus, apparatus, systems, methods and computer program products are herein disclosed that provide for technology evaluation. FIG. 1 provides a high level schematic diagram of an apparatus 10 configured for technology evaluation, in accordance with embodiments of the present invention. The apparatus 10 includes a computing platform 12 having at least one processor 14 and a memory 16 in communication with the processor 14. The memory 16 stores technology evaluation application 18, which is configured to evaluate a plurality of potential technology solutions, in terms of capabilities and constraints, for a specified project.

The technology evaluation application 18 includes capability weighting routine 20 that is configured to receive a plurality of capability importance indicators 22 that indicate the relative importance between one of a plurality of capabilities 24 and another of the plurality of capabilities 24. The capabilities are high-level capabilities predetermined from an overall list of capabilities based on stakeholder inputs. The capability weighting routine 20 is further configured to determine a capability weight 26 for each of the plurality of capabilities 24 based on the capability importance indicators 22. In specific embodiments of the invention the capability weighting routine is an Analytical Hierarchy Process (AHP) algorithm. AHP provides a comprehensive and rational framework for structuring a decision problem, for representing and quantifying its elements, for relating those elements to overall goals, and for evaluating alternative solutions. Further details related to capability importance indicator assessments and capability weighting determination are shown and described in relation to FIGS. 3-5, infra.

The technology evaluation application 18 includes constraint weighting routine 30 that is configured to receive a plurality of constraint importance indicators 32 that indicate the relative importance between one of a plurality of constraints 34 and another of the plurality of constraints 34. The constraints are high-level constraints predetermined from an overall list of constraints. The constraint weighting routine 30 is further configured to determine a constraint weight 36 for each of the plurality of constraints 34 based on the constraint importance indicators 32. In specific embodiments of the invention the constraint weighting routine is an Analytical Hierarchy Process (AHP) algorithm. Further details related to constraint importance indicator assessments and capability weighting determination are shown and described in relation to FIGS. 6-8, infra.

Technology evaluation application 18 additionally includes capability fit score routine 40 that is configured to receive capability applicability ratings 42 for each of a plurality of potential technology solutions 44 in relation to each of a plurality of capabilities 24. Thus, each applicability rating 42 indicates the strength of the relationship between a specific technology solution and a specific capability. The capability fit score routine 40 is further configured to determine a capability fit score 46 for each of the potential technology solutions 44 based on the capability weighting 26 and capability applicability ratings 42 for each capability 24. In addition, technology evaluation application 18 includes constraint fit score routine 50 that is configured to receive constraint applicability ratings 52 for each of a plurality of potential technology solutions 44 in relation to each of a plurality of constraints 34. Thus, each constraint applicability rating 52 indicates the strength of the relationship between a specific technology solution and a specific constraint. The constraint fit score routine 50 is further configured to determine a constraint fit score 54 for each of the potential technology solutions 44 based on the constraint weighting 36 and constraint applicability ratings 52 for each constraint 34.

In addition, technology evaluation application 18 includes technology fit routine 60 that is configured to determine a technology fit score 62 for each of the plurality of potential technology solutions 44 based on the capability fit score 46 and the constraint fit score 54.

Referring to FIG. 2, shown is an additional block diagram of apparatus 10, according to embodiments of the present invention. FIG. 2 highlights various alternate embodiments of the invention. The apparatus 10 may include one or more of any type of computerized device. The present apparatus and methods can accordingly be performed on any form of one or more computing devices.

The apparatus 10 includes computing platform 12 that can receive and execute routines and applications. Computing platform 12 includes memory 16, which may comprise volatile and non-volatile memory, such as read-only and/or random-access memory (RAM and ROM), EPROM, EEPROM, flash cards, or any memory common to computer platforms.

Further, memory 16 may include one or more flash memory cells, or may be any secondary or tertiary storage device, such as magnetic media, optical media, tape, or soft or hard disk.

Further, computing platform 12 also includes processor 14, which may be an application-specific integrated circuit ("ASIC"), or other chipset, processor, logic circuit, or other data processing device. Processor 14 or other processor such as ASIC may execute an application programming interface ("API") 70 that interfaces with any resident programs, such as technology evaluation application 18 and routines associated therewith or the like stored in the memory 16 of the apparatus 10.

Processor 14 includes various processing subsystems 80 embodied in hardware, firmware, software, and combinations thereof, that enable the functionality of apparatus 10 and the operability of the apparatus on a network. For example, processing subsystems 80 allow for initiating and maintaining communications and exchanging data with other networked devices. For the disclosed aspects, processing subsystems 80 of processor 14 may include any subsystem used in conjunction with technology evaluation application 18 and related routines, sub-routines, sub-modules thereof.

Computer platform 12 additionally may include communications module 90 embodied in hardware, firmware, software, and combinations thereof, that enables communications among the various components of the apparatus 10, as well as between the other networked devices. Thus, communication module 90 may include the requisite hardware, firmware, software and/or combinations thereof for establishing a network communication connection and communicating capability fit scores 46, constraint fit scores 54 and technology fit scores 62, related reports including the same or the like to business entities.

As previously noted, the memory 16 of apparatus 10 stores technology evaluation application 18, which is configured to evaluate a plurality of potential technology solutions for a project.

In specific embodiments of the invention, the technology evaluation application 18 includes capability importance spreadsheet mechanism 100, for receiving capability importance indicators 22 that each indicates the relative importance between each of the plurality of capabilities 24 and a corresponding one of the other capabilities 24. A specific example of a capability importance spreadsheet mechanism 100 is shown and described in relation to FIGS. 3-5, infra.

In one specific embodiment of the invention, in which the project is risk governance-type project, high-level capabilities 24 may include two or more of (1) risk, control, impact assessment; (2) metric management and monitoring; (3) process mapping framework/standards management and entity relationships; (4) event, issue, gap and remediation management; (5) policy governance and management; (6) regulatory/compliance change management and workflow to drive changes to control environments; (7) real time production systems, process performance and failure notification; (8) sense and respond to business and technology change management workflow; (9) customizable reporting and interoperability; (10) workflow, retention and management of evidence of audit trials for sign-off of key decisions, work-products and risk appetite; (11) knowledge base for future information requests, reviews, improvement activities and business/technology change management; and (12) technology considerations, such as event driven workflow, configurable role based access, useability, configuration, flexibility, common/scalable technologies employed or the like. In assessing the comparative importance of the capabilities 24 to one another, each capability 24 may be configured to include further attributes, which serve to define the capability 24 for the benefit of the entity making the capability importance indicator 22 assessments. In one specific embodiment of the invention, the capability importance indicators 22 include "much more important", which indicates that one capability 24 is much more important than the capability 24 it is being compared to; "more important", which indicates that one capability 24 is more important than the capability it is being compared to; "equally important", which indicates that the capability is equally important to the capability 24 it is being compared to; "less important", which indicates that one capability 24 is less important than the capability it is being compared to; and "much less important", which indicates that one capability 24 is much less important than the capability 24 it is being compared to.

In specific embodiments of the invention, the technology evaluation application 18 includes constraint importance spreadsheet mechanism 200, for receiving constraint importance indicators 32 that each indicates the relative importance between each of the plurality of constraints 34 and a corresponding one of the other constraints 34. A specific example of a constraint importance spreadsheet mechanism 200 is shown and described in relation to FIGS. 6-8, infra.

In one specific embodiment of the invention, high-level constraints 34 may include two or more of (1) time to configure rollout; (2) complex system requiring training and adoption; (3) workarounds required or manual processes required; (4) not supported by current corporate strategy or mandate; (5) increased ongoing number of full time employees required to implement/maintain business system integrity; (6) technology supplied or hosted by supplier; and (7) multiple integration points required including point-to-point interfaces between systems. In assessing the comparative importance of the constraints 34 to one another, each constraint 34 may be configured to include further attributes, which serve to define the constraint 34 for the benefit of the entity making the constraint importance indicator 32 assessments. In one specific embodiment of the invention, the constraint importance indicators 32 include "much more constraining", which indicates that one constraint 34 is much more constraining than the constraint 34 it is being compared to; "more constraining", which indicates that one constraint 34 is more constraining than the constraint it is being compared to; "equally constraining", which indicates that the constraint is equally constraining to the constraint 34 it is being compared to; "less constraining", which indicates that one constraint 34 is less constraining than the constraint it is being compared to; and "much less constraining", which indicates that one constraint 34 is much less constraining than the constraint 34 it is being compared to.

In further specific embodiments of the invention, the technology evaluation application 18 includes technology evaluation spreadsheet mechanism 300 suitable for receiving capability and constraint applicability ratings 42 and 52 that each indicate the relative importance between each of the plurality of potential technology solutions 44 and a corresponding one of the capabilities 24 or constraints 34. A specific example of a technology evaluation spreadsheet mechanism 300 is shown and described in relation to FIGS. 9-11, infra.

In further specific embodiments of the invention, the capability applicability rating 42 is a configured to be a integer value of zero, one, three, or nine where zero represents requirement not addressed; one represents minimal coverage of requirement; three represents partial coverage of the requirement (workarounds required); and nine represents majority of requirements covered. In other specific embodiment of the invention, the constraint applicability rating 52 is configured to be an integer of zero, three or nine, where zero represents that the constraint is not applicable; three represents that the constraint is a negligible factor; and nine represents that a constraint is a significant factor.

The technology evaluation application 18 further includes capability weighting routine 20 and constraint weighting routine 30 that are configured to determine a capability weight 26 and a constraint weight 36 for each of the plurality of capabilities 24 and constraints 34 based on the respective capability importance indicators 22 and constraint importance indicators 32. Additionally, as previously noted, in specific embodiments of the invention the capability weighting routine 20 and the constraint weighting routine 30 are an Analytical Hierarchy Process (AHP) algorithm. In specific embodiments of the invention, the capability weight 26 and the constraint weight 36 are represented in terms of a percentage such that the cumulative total of all the percentages for all the capabilities 24 or constraints 34 equals one-hundred percent (100%).

In specific embodiments of the invention, the technology evaluation application 18 includes technology evaluation spreadsheet mechanism 300, for determining capability fit scores 46, constraint fit scores 54 and technology fit scores 62. A specific example of a technology evaluation spreadsheet mechanism 300 is shown and described in relation to FIGS. 9-11, infra.

In addition, as previous noted, technology evaluation application 18 includes capability fit score routine 40 that is configured to determine a capability fit score 46 for each of the potential technology solutions based on the capability weighting 26 and capability applicability ratings 42 for each capability 24. In one specific embodiment of the invention, the capability fit score 46 is calculated by multiplying the capability applicability rating 42 by the capability weighting 26 for each capability 24 associated with the technology solution 44, summing the products of the multiplication and dividing the highest valued capability applicability rating. In such embodiments, the resulting capability fit score 46 is a provided as a percentage between zero and one-hundred. In addition, as previous noted, technology evaluation application 18 includes constraint fit score routine 50 that is configured to determine a constraint fit score 54 for each of the potential technology solutions 44 based on the constraint weighting 36 and constraint applicability ratings 52 for each constraint 34. In one specific embodiment of the invention, the constraint fit score 54 is calculated by multiplying the constraint applicability rating 52 by the constraint weighting 36 for each constraint 34 associated with the technology solution 44, summing the products of the multiplication and dividing the sum by the highest valued constraint applicability rating. In such embodiments, the resulting constraint fit score 54 is a provided as a percentage between zero and one-hundred.

Additionally, technology evaluation application 18 includes technology fit score routine 60 that is configured to determine an overall technology fit score 62 for each of the potential technology solutions 44 based on the capability fit score 46 and the constraint fit score 54. In specific embodiments, the technology fit score 60 is calculated as either as constraint-based technology fit score by subtracting the product of the capability fit score, the constraint fit score and a first weighting factor from the capability fit score or a capability-based technology fit score by subtracting the product of the capability fit score, the constraint fit score and a second weighting factor from the constraint fit score. The sum of the first weighting factor and the second weighting factor equals one or one-hundred percent.

Referring to FIG. 3 an example is shown of a capability weighting spreadsheet mechanism 100, including a capability importance indicator input mechanism, in accordance with an embodiment of the present invention. The capability weighting spreadsheet mechanism 100 may be a spreadsheet mechanism, such as an Excel® spreadsheet, distributed by the Microsoft Corporation of Redmond, Wash. or the like. The capability weighting spreadsheet mechanism 100 is in the form of a two-dimensional grid/matrix, in which the pre-defined capabilities 104-126 are listed vertically along the y-axis 102 and the same risk capabilities 104-126 are listed horizontally along the x-axis 103. The capabilities in the illustrated embodiment of FIG. 3 include risk assessment 104, metric management 106, process mapping 108, event management 110, policy governance and management 112, regulatory compliance 114, real time production/process performance 116, technology change management 118 customizable reporting 120, workflow retention 122, knowledge base 124 and technology considerations 126. However, it should be noted that the capabilities shown are by way of example only and other embodiments of the invention may include more or less capabilities based on the project type or the like. FIG. 3 additionally includes capability importance indicator key 128 that includes the various capability importance indicators 130-138. In the illustrated example, the importance indicators include, "Much More Important (MMI)" 130; "More Important (MI)" 132; "Equally Important (EQUAL)" 134; "Less Important (LI)" 136; and "Much More Important (MLI)" 138. However, it should be noted that the importance indicators 130-138 shown are by way of example only and other embodiments of the invention may include more or less importance indicators based on the needs of the project or the like.

FIG. 4 is an example of a capability weighting spreadsheet 100, including a capability importance indicator input mechanism, in which capability importance indicators 130-138 have been received into the grid/matrix 140. The importance indicators 130-138 represent the relative importance of the capabilities to one another for a particular project. Based on the capability importance indicator key 128, which indicates that the Y-axis capability is "_____" than the x-axis capability, where the "_____" is filled in with the assigned importance indicator 130-138. Thus, for example, reading the received capability importance indicators 130-138 in grid/matrix 140, beginning at the top, left-hand corner, risk assessment is equally important to metric management; risk assessment is less important than process mapping; risk assessment is equally important to event management; risk assessment is equally important to policy governance management; etc.

FIG. 5 is an example of a capability weighting spreadsheet 100, including a capability importance indicator input mechanism, in which the capability weighting routine (20 of FIGS. 1 and 2) has been executed to determine a capability weighting 142 for each of the capabilities 104-126 based on the capability importance indicators 130-138 received into grid 140. In the illustrated example an Analytical Hierarchy Process algorithm has been implemented to determine capability weightings 142. In the illustrated example of FIG. 5, risk assessment 104 has been determined to have a capability weight of five percent; metric management 106 has been determined to have a capability weight of eleven percent; process mapping 108 has been determined to have a risk weight of eleven percent; event management 110 has been determined to have a capability weight of nine percent; policy governance and management 112 has been determined to have a capability weight of four percent; regulatory compliance 114 has been determined to have a capability weight of sixteen percent; real time production 116 has been determined to have a capability weight of five percent; technology change management 118 has been determined to have a capability weight of four percent; customizable reporting 120 has been determined to have a capability weight of fifteen percent; workflow retention 122 has been determined to have a capability weight of nine percent; knowledge base 124 has been determined to have a capability weight of three percent; and technology considerations 126 has been determined to have a capability weight of nine percent.

Referring to FIG. 6 an example is shown of a constraint weighting spreadsheet mechanism 200, including a constraint importance indicator input mechanism, in accordance with an embodiment of the present invention. The constraint weighting spreadsheet mechanism 200 may be a spreadsheet mechanism, such as an Excel® spreadsheet, distributed by the Microsoft Corporation of Redmond, Wash. or the like. The constraint weighting spreadsheet mechanism 200 is in the form of a two-dimensional grid/matrix, in which the pre-defined constraints 206-218 are listed vertically along the y-axis 202 and the same risk constraints 206-218 are listed horizontally along the x-axis 204. The constraints in the illustrated embodiment of FIG. 6 include time to configure rollout 206, complex system requiring training 208, workarounds required 210, not within current corporate strategy 212, additional full time employees required 214, technology supplied by supplier 216, and multiple integration points 218. However, it should be noted that the constraints shown are by way of example only and other embodiments of the invention may include more or less constraints based on the project type or the like. FIG. 6 additionally includes constraint importance indicator key 220 that includes the various constraint importance indicators 222-230. In the illustrated example, the importance indicators include, "Much More Constraining (MMC)" 222; "More Constraining (MC)" 224; "Equally Constraining (EQUAL)" 226; "Less Constraining (LC)" 228; and "Much More Constraining (MLI)" 230. However, it should be noted that the constraint importance indicators 222-230 shown are by way of example only and other embodiments of the invention may include more or less constraint importance indicators based on the needs of the project or the like.

FIG. 7 is an example of a constraint weighting spreadsheet 200, including a constraint importance indicator input mechanism, in which constraint importance indicators 222-230 have been received into the grid/matrix 232. The importance indicators 222-230 represent the relative importance of the constraints to one another for a particular project. Based on the constraint importance indicator key 220, which indicates that the Y-axis constraint is "_" than the x-axis constraint, where the "_" is filled in with the assigned importance indicator 222-230. Thus, for example, reading the received constraint importance indicators 222-230 in grid/matrix 232, beginning at the top, left-hand corner, time to configure rollout is equally constraining to complex system requiring training; time to configure rollout is less constraining than workarounds required; time to configure rollout is equally constraining to not within current corporate strategy; etc.

FIG. 8 is an example of a constraint weighting spreadsheet 200, including a constraint importance indicator input mechanism, in which the constraint weighting routine (30 of FIGS. 1 and 2) has been executed to determine a constraint weighting 234 for each of the constraints 206-218 based on the constraint importance indicators 222-230 received into grid 232. In the illustrated example an Analytical Hierarchy Process algorithm has been implemented to determine constraint weightings 234. In the illustrated example of FIG. 8, time to configure rollout 206 has been determined to have a constraint weight of thirteen percent; complex system requiring training 208 has been determined to have a constraint weight of seven percent; workarounds required/manual processes required 210 has been determined to have a constraint weight of seventeen percent; not within current corporate strategy 212 has been determined to have a constraint weight of six percent; additional employees required 214 has been determined to have a constraint weight of fifteen percent; technology supplied by supplier 216 has been determined to have a constraint weight of three percent; and multiple integration points 218 has been determined to have a constraint weight of thirty-nine percent.

Referring to FIGS. 9A and 9B an example is shown of a technology evaluation spreadsheet mechanism 300, including a capability and constraint applicability rating input mechanism, in accordance with an embodiment of the present invention. The technology evaluation spreadsheet mechanism 300 is a spreadsheet-based input mechanism, such as an Excel.RTM. spreadsheet, distributed by the Microsoft Corporation of Redmond, Wash. or the like. The capability and constraint input mechanisms are in the form of a two-dimensional grid/matrix 316 and 318, in which the capabilities 302 and the constraints 304 are listed vertically along the y-axis and the potential technology solutions 306 are listed horizontally along the x-axis. The potential technology solutions are further categorized according to technology solutions currently business-unit production/use 308; technology solutions currently in enterprise production/use 310; supplier solutions (technology solutions not currently in enterprise production/use) 312; and merged solutions that include more than one technology solution currently in enterprise production/use 314. The capabilities 302 and constraints 304 in the illustrated embodiment of FIGS. 9A and 9B are the same as those shown and described in FIGS. 3-5 and FIGS. 6-8. The capabilities 302 include risk assessment 104, metric management 106, process mapping 108, event management 110, policy governance and management 112, regulatory compliance 114, real time production/process performance 116, technology change management 118 customizable reporting 120, workflow retention 122, knowledge base 124 and technology considerations 126. The constraints 304 include time to configure rollout 206, complex system requiring training 208, workarounds required 210, not within current corporate strategy 212, additional full time employees required 214, technology supplied by supplier 216, and multiple integration points 218. FIGS. 9A and 9B additionally include applicability rating key 320 that includes the various capability and constraint applicability ratings 322-334. In the illustrated example capability applicability ratings include, "zero" 322, which indicates requirement not addressed; "one" 324, which indicates minimal coverage of the requirement; "three" 326, which indicates the solution partially addresses the requirement (workaround may be required); and "nine" 328, which indicates a solution addresses majority of requirements. The constraint applicability ratings include, "zero" 330, which indicates the constraint is not applicable; "three" 332, which indicates the constraint is a negligible factor; and "nine" 334, which indicates the constraint is a significant factor. It should be noted that the applicability ratings 322-334 shown are by way of example only and other embodiments of the invention may include more or less applicability ratings based on the needs of the project and/or entity implementing the technology evaluation procedure of the present invention.

Additionally, the technology evaluation spreadsheet 300 includes capability and constraint weightings 142 and 234 that are imported from capability weighting spreadsheet mechanism 100 (FIGS. 3-5) and constraint weighting spreadsheet mechanism 200 (FIGS. 4-6). Moreover, technology evaluation spreadsheet 300 includes rows for capability fit score 336, constraint fit score 338 and technology fit score 340.

FIGS. 10A and 10B are an example of a technology evaluation spreadsheet mechanism 300, including a capability and constraint applicability rating input mechanism, in which capability and constraint applicability ratings 322-334 have been received into corresponding grids/matrix 316 and 318. The applicability ratings 322-334 represent the degree of relationship between a capability or constraint and potential technology solution. In the illustrated example of FIGS. 10A and 10B, reading the received capability applicability ratings in grid/matrix 316, beginning at the top, left-hand corner, the capability applicability rating for risk assessment and technology solution #1 is "one"; the capability applicability rating for risk assessment and technology solution #2 is "one"; the capability applicability rating for risk assessment and technology solution #3 is "three"; the capability applicability rating for risk assessment and technology solution #4 is "three"; etc. Additionally, reading the received constraint applicability ratings in grid/matrix 318, beginning at the top, left-hand corner, the constraint applicability rating for time to configure rollout and technology solution #1 is "zero"; the capability applicability rating for time to configure rollout and technology solution #2 is "zero"; the capability applicability rating for time to configure rollout and technology solution #3 is "zero"; the capability applicability rating for time to configure rollout and technology solution #4 is "three"; etc.

FIGS. 11A and 11B are an example of a technology evaluation spreadsheet mechanism 300, including a capability and constraint applicability rating input mechanism, in which the capability fit score routine, the constraint fit score routine and the technology fit score routine (40, 50 and 60 of FIGS. 1 and 2) have been executed to determine a capability fit score, a constraint fit score and an overall technology fit score for each of the potential technology solutions 306 based on the capability/constraint applicability ratings 322-334 received into grids 316 and 318 and the capability and constraint risk weightings 142 and 234 imported from capability weighting spreadsheet 100 and constraint weighting spreadsheet 200 of FIGS. 3-5 and FIGS. 6-8.

In the illustrated example, the capability fit scores, which are shown in capability fit score row 336 are determined by multiplying each of the capability applicability ratings for a specified potential technology solution by the associated capability weighting, summing all of the multiplication products and dividing by the maximum number for capability applicability rating (in this example, the maximum capability applicability rating is nine). Thus, in the illustrated example of FIGS. 11A and 11B, the capability fit score for technology solution #1 is calculated as ((0.05×1)+(0.11×0)+(0.11×0)+ (0.09×0)+(0.04×9)+(0.16×0)+(0.05×0)+(0.04×0)+(0.15× 3)+(0.09×1)+(0.03×3)+(0.09×3))/9=14 percent.

In the illustrated example, the constraint fit scores, which are shown in constraint fit score row 338 are determined by multiplying each of the constraint applicability ratings for a specified potential technology solution by the associated constraint weighting, summing all of the multiplication products and dividing by the maximum number for constraint applicability rating (in this example, the maximum constraint applicability rating is nine). Thus, in the illustrated example of FIGS. 11A and 11B, the constraint fit score for technology solution #2 is calculated as ((0.13.times.0)+(0.07.times.0)+ (0.17.times.9)+(0.06.times.3)+(0.15.times.-3)+ (0.03.times.0)+(0.39.times.9))/9=63 percent.

The overall technology fit scores, which are shown in technology fit score row 340 are determined based on the capability fit score and the constraint fit score and, in some embodiments a weighting factor. In the embodiment shown in FIGS. 11A and 11B, in which constraint is weighted 25 percent and capability is weighted 75 percent, the constraint-based technology fit score is calculated by subtracting the product of the capability fit score, the constraint fit score and the constraint weighting factor from the capability fit score. In alternate embodiments a capability-based technology fit score may be calculated by subtracting the product of the capability fit score, the constraint fit score and a capability weighting factor from the constraint fit score. Thus, in the illustrated embodiment of FIGS. 11A and 11B the constraint-based technology fit score, where the constraint weight factor is 25%, for technology solution #2 is calculated as 0.17− (0.17.times.0.63..times.0.25)=14 percent.

FIG. 12 represents a bubble diagram of the results of the technology evaluation. The vertical y-axis 402 represents ascending constraint fit scores and the horizontal x-axis 404 represents ascending capability fit scores. Each bubble represents a potential technology solution, bubbles 406 represent potential technology solutions that are currently in business unit production/use (technology solution #1-#3), bubbles 408 represent potential technology solutions that are currently in enterprise production/use (technology solutions #4-#6), bubbles 410 represent potential technology solutions that are supplied solutions. i.e., not currently in enterprise production/ use (technology solutions #7-#9) and bubble 412 represents a potential technology solution that is a merge of two or more technology solutions currently in enterprise production/use. The size of the bubble represents the overall technology fit score shown in FIGS. 11A and 11B. The best fit is a technical solution that maximizes capability while minimizing constraint. Thus, technical solutions appearing in the lower right quadrant are the most desirable or "best fit" solutions. In the illustrated embodiment of FIG. 12, two of the supplied solutions 410 are determined to provide the best technology fit.

Turning the reader's attention to FIG. 13 a flow diagram is depicted of a method 500 for technology evaluation based on capability and constraint, in accordance with embodiments of the present invention. At Event 510, a capability importance indicator is received for each of a plurality of capabilities in comparison to each of the other capabilities and a constraint importance indicator is received for each of a plurality of constraints in comparison to each of the other constraints. The capability importance indicator indicates the level of relational importance between two capabilities and the constraint importance indicator indicates the level of relational constraint between two or more constraints.

At Event 520, a capability weighting and a constraint weighting are determined for each of the capabilities and constraints based on the corresponding capability importance indicators and constraint importance indicators. In specific embodiments of the invention, Analytical Hierarchy Process (AHP) is implemented to determine the capability and constraint weightings.

At Event 530, capability applicability ratings and constraint applicability ratings are received for each of a plurality of potential technology solutions in relation to each of a plurality of capabilities or constraints. The applicability rating may be an integer value where zero represents no relationship between the potential technology solution and the capability/constraint and a highest configured integer represents the strongest relationship between the potential technology solution and the capability/constraint.

At Event 540, capability fit scores and constraint fit scores are determined for each of the potential technology solutions based on the associated capability/constraint applicability rating and the associated capability/constraint weighting. In specific embodiments of the invention, the capability/constraint fit score is determined by multiplying the capability/constraint weighting by the capability/constraint applicability rating for each capability/constraint, summing the multiplied products and dividing the sum by the highest value of the capability/constraint applicability rating.

At Event 550, technology fit scores are determined for each potential technology solution based on the associated capability fit score and the associated constraint fit score. In specific embodiments of the invention the technology fit score may be determined as a constraint-based technology fit score by subtracting the product of the capability fit score, the constraint fit score and a first weighting factor from the capability fit score or determined as a capability-based technology fit score by subtracting the product of the capability fit score, the constraint fit score and a second weighting factor from the constraint fit score, In such embodiments, the sum of the first weighting factor and the second weighting factor equals one or one-hundred percent.

Thus, present embodiments herein disclosed provide for evaluating and selecting technology. Specifically, present embodiments provide for assessing the relative importance of various capabilities and constraints to determine weighting factors and applying the weighting factors to potential technology solutions rated in terms of the applicability of the capabilities and constraints. The result is a capability fit score and a constraint fit score for each potential technology solution, which can be combined to form an overall technology fit score for each potential technology solution. Thus, present embodiments assess capabilities and constraints of various potential technology solutions and balance the capabilities and constraints to result in a quantitatively measurement of which technology solution is the best fit for the project at hand.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other updates, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. An apparatus for technology evaluation, the apparatus comprising:
   a computing device including a memory and at least one processor; and
   a technology evaluation application stored in the memory, executable by the processor, configured to provide technology recommendations for a project and including:
   a capability weighting routine configured to receive a capability importance indicator for each of a plurality of predefined capabilities in comparison to each of the other capabilities and determine a capability weighting for each of the capabilities based on the capability importance indicators;
   a constraint weighting routine configured to receive a constraint importance indicator for each of the plurality of predefined constraints in comparison to each of the other constraints and determine a constraint weighting for each of the constraints based on the constraint importance indicators;
   a capability fit score routine configured to receive a capability applicability rating for each of a plurality of potential technology solutions in relation to each of the predetermined capabilities and determine a capability fit score for each of the potential technology solutions based on associated capability applicability ratings and associated capability weightings;
   a constraint fit score routine configured to receive a constraint applicability rating for each of the plurality of potential technology solutions in relation to each of the predetermined constraints and determine a constraint fit score for each of the potential technology solutions based on associated constraint applicability ratings and associated constraint weightings; and
   a technology fit score routine configured to determine a technology fit score for each of the potential technology solutions based on an associated capability fit score and an associated constraint fit score.

2. The apparatus of claim 1, wherein the technology evaluation application further comprises a technology evaluation spreadsheet mechanism configured to include the capability fit score routine, the constraint fit score routine and the technology fit score routine.

3. The apparatus of claim 1, wherein the technology evaluation application further comprises a capability importance spreadsheet mechanism configured to include the capability weighting routine.

4. The apparatus of claim 1, wherein the technology evaluation application further comprises a constraint importance spreadsheet mechanism configured to include the constraint weighting routine.

5. The apparatus of claim 1, wherein the capability weighting routine is further configured to implement Analytical Hierarchy Process (AHP) to determine the capability weightings.

6. The apparatus of claim 1, wherein the constraint weighting routine is further configured to implement Analytical Hierarchy Process (AHP) to determine the constraint weightings.

7. The apparatus of claim 1, wherein the capability weighting routine is further configured to receive the capability importance indicator, wherein the capability importance indicator is one of (1) much more important, (2) more important, (3) equally important, (4) less important or (5) much less important.

8. The apparatus of claim 1, wherein the constraint weighting routine is further configured to receive the constraint importance indicator, wherein the constraint importance indicator is one of (1) much more constraining, (2) more constraining, (3) equally constraining, (4) less constraining or (5) much less constraining.

9. The apparatus of claim 1, wherein the capability fit score routine is further configured to determine the plurality capability fit scores by multiplying, for each capability, the capability weighting by the capability applicability rating to result in a product, summing the products and dividing the sum by a highest valued capability applicability rating.

10. The apparatus of claim 1, wherein the constraint fit score routine is further configured to determine the plurality constraint fit scores by multiplying, for each constraint, the constraint weighting by the constraint applicability rating to result in a product, summing the products and dividing the sum by a highest valued constraint applicability rating.

11. The apparatus of claim 1, wherein the technology fit score routine is further configured to determine the technology fit scores by one of (1) subtracting the product of the capability fit score, the constraint fit score and a first weighting factor from the capability fit score or (2) subtracting the product of the capability fit score, the constraint fit score and a second weighting factor from the constraint fit score, wherein a sum of the first weighting factor and the second weighting factor equals one.

12. A method for technology evaluation, the method comprising:
receiving a capability importance indicator for each of a plurality of predefined capabilities in comparison to each of the other capabilities and a constraint importance indicator for each of a plurality of predefined constraints in comparison to each of the other constraints;
determining, via a computing device processor, a capability weighting for each of the capabilities based on the capability importance indicators and a constraint weighting for each of the constraints based on the constraint importance indicators;
receiving a capability applicability rating for each of a plurality of potential technology solutions in relation to each of the predetermined capabilities and a constraint applicability rating for each of the plurality of potential technology solutions in relation to each of the predetermined constraints;
determining, via the computing device processor, a capability fit score for each of the potential technology solutions based on associated capability applicability ratings and associated capability weightings and a constraint fit score for each of the potential technology solutions based on associated constraint applicability ratings and associated capability weightings; and
determining, via the computing device processor, a technology fit score for each of the potential technology solutions based on an associated capability fit score and an associated constraint fit score.

13. The method of claim 12, wherein determining the capability weighting further comprises determining, via the computing device processor, the capability weighting by implementing Analytical Hierarchy Process (AHP).

14. The method of claim 12, wherein determining the constraint weighting further comprises determining, via the computing device processor, the constraint weighting by implementing Analytical Hierarchy Process (AHP).

15. The method of claim 12, wherein receiving the capability importance indicator further comprises receiving the capability importance indicator, wherein the capability importance indicator is one of (1) much more important, (2) more important, (3) equally important, (4) less important and (5) much less important.

16. The method of claim 12, wherein receiving the constraint importance indicator further comprises receiving the constraint importance indicator, wherein the constraint importance indicator is one of (1) much more constraining, (2) more constraining, (3) equally constraining, (4) less constraining and (5) much less constraining.

17. The method of claim 12, wherein determining the capability fit score further comprises multiplying, via the computing device processor, for each capability, the capability weighting by the capability applicability rating to result in a product, summing the products and dividing the sum by a highest valued capability applicability rating.

18. The method of claim 12, wherein determining the constraint fit score further comprises multiplying, via the computing device processor, for each constraint, the constraint weighting by the constraint applicability rating to result in a product, summing the products and dividing the sum by a highest valued constraint applicability rating.

19. The method of claim 12, wherein determining the technology fit score further comprises determining, via the computing device processor, the technology fit score by one of (1) subtracting the product of the capability fit score, the constraint fit score and a first weighting factor from the capability fit score or (2) subtracting the product of the capability fit score, the constraint fit score and a second weighting factor from the constraint fit score, wherein a sum of the first weighting factor and the second weighting factor equals one.

20. A computer program product comprising:
a non-transitory computer-readable medium comprising:
a first set of codes for causing a computer to receive a capability importance indicator for each of a plurality of predefined capabilities in comparison to each of the other capabilities and a constraint importance indicator for each of a plurality of predefined constraints in comparison to each of the other constraints;
a second set of codes for causing a computer to determine a capability weighting for each of the capabilities based on the capability importance indicators and a constraint weighting for each of the constraints based on the constraint importance indicators;
a third set of codes for causing a computer to receive a capability applicability rating for each of a plurality of potential technology solutions in relation to each of the predetermined capabilities and a constraint applicability rating for each of the plurality of potential technology solutions in relation to each of the predetermined constraints;
a fourth set of codes for causing a computer to determine a capability fit score for each of the potential technology solutions based on associated capability applicability ratings and associated capability weightings and a constraint fit score for each of the potential technology solutions based on associated constraint applicability ratings and associated constraint weightings; and
a fifth set of codes for causing a computer to determine a technology fit score for each of the potential technology solutions based on an associated capability fit score and an associated constraint fit score.

21. The computer program product of claim 20, wherein the second set of codes is further configured to cause the computer to determine the capability weighting by implementing Analytical Hierarchy Process (AHP).

22. The computer program product of claim 20, wherein the second set of codes is further configured to cause the computer to determine the constraint weighting by implementing Analytical Hierarchy Process (AHP).

23. The computer program product of claim 20, wherein the first set of codes is further configured to cause the computer to receive the capability importance indicator, wherein the capability importance indicator is one of (1) much more important, (2) more important, (3) equally important, (4) less important and (5) much less important.

24. The computer program product of claim 20, wherein the first set of codes is further configured to cause the computer to receive the constraint importance indicator, wherein the constraint importance indicator is one of (1) much more constraining, (2) more constraining, (3) equally constraining, (4) less constraining and (5) much less constraining.

25. The computer program product of claim 20, wherein the fourth set of codes is further configured to cause the computer to determine the capability fit score by multiplying, for each capability, the capability weighting by the capability applicability rating to result in a product, summing the products and dividing the sum by a highest valued capability applicability rating.

26. The computer program product of claim 20, wherein the fourth set of codes is further configured to cause the computer to determine the constraint fit score by multiplying, for each constraint, the constraint weighting by the constraint applicability rating to result in a product, summing the products and dividing the sum by a highest valued capability applicability rating.

27. The computer program product of claim 20, wherein the fifth set of codes is further configured to cause the computer to determine the technology fit score by one of subtracting the product of the capability fit score, the constraint fit score and a first weighting factor from the capability fit score or subtracting the product of the capability fit score, the constraint fit score and a second weighting factor from the constraint fit score, wherein a sum of the first weighting factor and the second weighting factor equals one.

* * * * *